(12) United States Patent
Simmons et al.

(10) Patent No.: US 12,034,729 B2
(45) Date of Patent: Jul. 9, 2024

(54) SYSTEM AND METHOD FOR COMPUTER SYSTEM SECURITY AUTHORIZATION INTERFACES

(71) Applicant: ODNA, LLC, Yukon, OK (US)

(72) Inventors: Christina Simmons, Yukon, OK (US); Ron Nicholson, Yukon, OK (US)

(73) Assignee: ODNA, LLC, Yukon, OK (US)

( * ) Notice: Subject to any disclaimer, the term of this patent is extended or adjusted under 35 U.S.C. 154(b) by 59 days.

(21) Appl. No.: 18/045,684

(22) Filed: Oct. 11, 2022

(65) Prior Publication Data

US 2023/0110496 A1 Apr. 13, 2023

Related U.S. Application Data

(60) Provisional application No. 63/254,402, filed on Oct. 11, 2021.

(51) Int. Cl.
| | |
|---|---|
| *G06F 21/45* | (2013.01) |
| *G06F 21/62* | (2013.01) |
| *G06Q 10/06* | (2023.01) |
| *H04L 9/40* | (2022.01) |
| *G06F 21/60* | (2013.01) |
| *G06F 21/71* | (2013.01) |
| *G06Q 10/105* | (2023.01) |

(52) U.S. Cl.
CPC .......... *H04L 63/101* (2013.01); *H04L 63/102* (2013.01); *H04L 63/104* (2013.01); *H04L 63/107* (2013.01)

(58) Field of Classification Search
None
See application file for complete search history.

(56) References Cited

U.S. PATENT DOCUMENTS

| | | |
|---|---|---|
| 6,947,989 B2 | 9/2005 | Gullotta et al. |
| 7,350,144 B2 | 3/2008 | Burg et al. |

(Continued)

OTHER PUBLICATIONS

USPTO acting as the International Searching Authority; International Search Report and Written Opinion in PCT/US2022/077876, dated Jan. 17, 2023.

(Continued)

*Primary Examiner* — Venkat Perungavoor
(74) *Attorney, Agent, or Firm* — Dunlap Codding, P.C.

(57) ABSTRACT

Systems and methods for computer system security authorization interfaces are described, including a non-transitory computer readable medium having computer executable instructions that when executed cause a processor to direct a directory server to create a position group, the directory server storing position-access permissions assigned to a plurality of permission groups, and to assign the position group as a member within the permission groups; and to assign a username to the position group, thereby associating the position group with the person and assigning the position-access permissions to the person. The position groups contain no usernames and are each associated with no more than one person at any one time. An interface application may allow a user to communicate with a directory server to manage position-access permissions within a directory service domain based on positions within an organizational structure of an organization, rather than on usernames.

20 Claims, 22 Drawing Sheets

(56) References Cited

U.S. PATENT DOCUMENTS

| | | |
|---|---|---|
| 7,606,801 B2 | 10/2009 | Faitelson et al. |
| 7,774,601 B2 | 8/2010 | Devgan et al. |
| 8,306,999 B2 | 11/2012 | Gass, III et al. |
| 8,381,306 B2* | 2/2013 | McPherson ......... G06F 21/6218 |
| | | 726/28 |
| 8,452,873 B2 | 5/2013 | Chen et al. |
| 8,533,168 B2 | 9/2013 | Kuehr-McLaren et al. |
| 9,143,514 B2 | 9/2015 | Hu et al. |
| 9,313,207 B2 | 4/2016 | Cicchitto |
| 9,424,554 B2 | 8/2016 | Hayton et al. |
| 9,922,308 B2 | 3/2018 | Mudler et al. |
| 10,049,229 B1 | 8/2018 | Westcott |
| 10,114,964 B2* | 10/2018 | Ramesh ............. G06F 21/6218 |
| 10,552,796 B1 | 2/2020 | Delacourt et al. |
| 10,855,790 B2 | 12/2020 | Long, III et al. |
| 11,711,374 B2* | 7/2023 | Ross ................... G06F 21/604 |
| | | 726/28 |
| 2003/0220825 A1 | 11/2003 | Tseng |
| 2007/0143336 A1 | 6/2007 | Lindley et al. |
| 2012/0253872 A1 | 10/2012 | Peters et al. |
| 2014/0053110 A1 | 2/2014 | Brown et al. |
| 2014/0129457 A1 | 5/2014 | Peeler |
| 2015/0074014 A1* | 3/2015 | Radkowski ............ G06F 21/41 |
| | | 705/342 |
| 2016/0294881 A1* | 10/2016 | Hua ....................... H04L 63/20 |
| 2021/0021423 A1* | 1/2021 | Latorre .................. G06Q 10/10 |
| 2021/0150449 A1 | 5/2021 | Mann et al. |

OTHER PUBLICATIONS

ODNA, LLC; Response to Jan. 17, 2023 International Search Report and Written Opinion in PCT/US2022/077876, Filed Aug. 11, 2023.

Sailpoint, Automated Provisioning (downloaded from the internet at: https://www.sailpoint.com/solutions/provisioning/, last visited Apr. 28, 2021).

Sailpoint, What is Automated Provisioning? (downloaded from the internet at: https://www.sailpoint.com/identity-library/what-is-automated-provisioning/ , last visited Apr. 28, 2021).

Oracle, Fusion Middleware User's Guide for Oracle Identify Manager (downloaded from the internet at: https://docs.oracle.com/cd/E40329_01/user.1112/e27151/idntmngr.htm#OMUSG2828, last visited Apr. 29, 2021).

Microsoft, How Provisioning Works (downloaded from the internet at: https://docs.microsoft.com/en-us/azure/active-directory/app-provisioning/how-provisioning-works , dated Nov. 4, 2020, last visited Apr. 29, 2021).

IBM, IBM Security Identity Manager—Organizational Roles and Access Provisioning (downloaded from the internet at: https://www.ibm.com/docs/en/sim/6.0.0.22?topic=planning-organizational-roles-access-provisioning , last visited Apr. 29, 2021).

United States Patent and Trademark Office acting as the International Search Authority, International Preliminary Report on Patentability (Chapter II of the Patent Cooperation Treaty) regarding PCT/US2022/077876, Dated Feb. 2, 2024.

* cited by examiner

Position Setup

- Name: CEO
- Description: Chief Executive Officer
- Company: Company A
- Division: Executive Division
- Department: Executive Department
- Area: Headquarters
- Location: 4359 Sunrise Road, Ste. 10...
- Project: Management
- Category: C-Suite
- Template:

Reports:
- Sales reports ☑
- Revenues and expenses ☑

Apps:
- Word processor ☑
- ODNA ☑

Network Resources:
- Main Printer ☑
- Main Facsimile ☑

[Submit] [Cancel]

FIG. 5B

Network Resource Setup — 2700

| | |
|---|---|
| Name: | PRINTER_MAIN |
| Description: | Laser printer located in conference room of Mai... |
| Address: | 192.168.1.150 |
| Category: | Administrative |

2702a-n

[Submit] — 2704  [Cancel] — 2706

FIG. 27

Project Setup — 2800

| | |
|---|---|
| Name: | |
| Description: | |
| Category: | |

2802a-n

Reports:
- Sales reports ☑
- Revenues and expenses ☑

Apps:
- Word processor ☑
- ODNA ☑

2804a-n

Network Resources: 2804a-n
- Main printer ☑
- Main facsimile ☑

[Submit] — 2806  [Cancel] — 2808

FIG. 28

SYSTEM AND METHOD FOR COMPUTER SYSTEM SECURITY AUTHORIZATION INTERFACES

CROSS-REFERENCE TO RELATED APPLICATIONS

This application claims the benefit of U.S. Provisional Patent Application No. 63/254,402, filed Oct. 11, 2021, entitled "SYSTEM AND METHOD FOR COMPUTER SYSTEM SECURITY AUTHORIZATION INTERFACES", which is hereby incorporated in its entirety herein.

BACKGROUND

The security of technological systems is critical to the continuing operation of those systems. Technological security may include elements such as authentication of users and authorization of use of (that is, access to) individual technology for a user. This may include levels of authorizations that allow more or less access to one or more technological systems for a particular user based on what user-access permissions are assigned to the user. These technological systems may include, for example, software applications, reports, databases, network drives, and network-connected devices (such as network printers, network scanners, network photocopiers, network faxes, etc.).

Currently, there are electronic directory-based identity-related computer systems (also known as directory services) that fulfill these functions based on usernames for each user. One example of such a system is an enterprise identity service, which controls security based on usernames, which is sold under the trademark Active Directory, produced by Microsoft Corporation of One Microsoft Way, Redmond, WA 98052-7329.

It is not uncommon for a username to be associated with several hundred user-access permissions. However, a change of a user within an organization, such as a new user, a removed user, or a user moved within an organizational structure, necessitates an information technology administrator to change the username throughout the electronic directory services, which may be difficult, costly, and time-consuming. The current process of changing these permissions by username is error-prone and typically results in users having one or more wrong permissions or maintaining permissions that should be removed. Further, this may become unworkably complicated when performed at scale based on the current structures of directory services systems, for example, during a reorganization within, or acquisition by, an organization. In such cases, the user-access permissions for hundreds or thousands of users, and sometimes for hundreds of user-access permissions per user, must be changed, usually under short time constraints.

For example, organizations typically have an information technology (IT) department responsible for managing (assigning, changing, and deleting) user-access permissions to each of the organization's employees. To understand the scope of the problems, an IT department in a typical large organization may have a handful of employees to manage user-access permissions to hundreds of software applications, a thousand desktop and laptop computers, tens of thousands of reports, and volumes of servers and peripherals, based on employee usernames and needed access.

To be certain that an employee will only see the content that is relevant to their specific needs, each username is placed in each of the proper permission groups in a directory service system. To accomplish this, an IT employee typically spends many hours setting up the proper user-access permissions in a directory service system for the username, such as application groups, network resources (e.g., a desktop or laptop computer, a monitor, a phone, a printer, etc.), and reports. Former employees or moved employees must also have usernames moved or deleted from each and every user-access permission group.

Additionally, when organizations expand, new permission groups are created in the directory service and new usernames need to be established for each of the new employees and placed in each of the new permission groups. With the computer structure of current systems, this required a massive outlay of both computer resources and manhours (sometimes hundreds of manhours). Additionally, the structure of current user-access permission systems leads to errors and erroneous user-access permissions given or maintained, or needed user-access permissions not assigned. Keeping current user-access permission systems correct and "clean"—meaning that each employee has the proper access, resources, and information—is very difficult and time-consuming with current computer structures. In many cases, the permission groups that exist are inaccurate, outdated, and incomplete.

Accordingly, there exists a need for computer-implemented systems and methods configured to interface with a directory service to manage user access to network resources while being associated with real-world changes to an organization.

SUMMARY OF THE INVENTION

The problems described above involving managing electronic user access to computer network resources may be solved by computer-implemented systems and methods that transform organizational positions into user access, thereby eliminating the need for information technology personnel to change usernames throughout computer systems and thereby linking organizational position changes to user access. The computer-implemented systems and methods may change the structure of access permission systems to increase accuracy of those systems, while saving computer resources and/or IT resources. An interface application may allow a user to communicate with a directory server to manage access permissions within a directory service domain based on positions within an organizational structure of an organization (i.e., position-access permissions), rather than on usernames (i.e., username-based permissions).

In one implementation, a non-transitory computer readable medium may have computer executable instructions that when executed cause a processor to receive a first input from a user interface, the first input indicative of a username of a person to be associated or dissociated with a position within an organizational structure of an organization; and direct a directory server to assign the username to a position group within the directory server when the person is associated with the position and to remove the username from the position group when the person is dissociated with the position, thereby associating or dissociating correspondingly the position group with the person identified by the username, the position group associated with no more than one person at any one time, the directory server storing position-access permissions assigned to a plurality of permission groups, the plurality of permission groups containing no usernames, the position group associated with two or more permission groups of the plurality of permission groups, thereby assigning position-access permissions assigned to the two or more permission groups to the person associated with the position group or revoking the position-access permissions assigned to the two or more permission groups from the person dissociated with the position group.

In one implementation, a non-transitory computer readable medium may have computer executable instructions that, when executed, may cause a processor to receive a first input from a user interface, the first input indicative of a new position within an organizational structure of an organization; direct a directory server to create a position group for the new position within the directory server, the directory server storing position-access permissions assigned to a plurality of permission groups, the plurality of permission groups containing no usernames; direct the directory server to nest the position group within two or more permission groups of the plurality of permission groups by assigning the position group as a member within each of the two or more permission groups; receive a second input from the user interface, the second input indicative of a username associated with the new position, the username identifying a person assigned to the new position within the organization; and direct the directory server to assign the username to the position group, thereby associating the position group with the person identified by the username, the position group associated with no more than one person at any one time, and thereby assigning the position-access permissions within the two or more permission groups to the person associated with the position group.

In some implementations, the user interface may be a graphical user interface displayed on a display screen. The graphical user interface may comprise an interactive organizational chart corresponding to positions within a real-world organization.

The details of one or more implementations of the subject matter described in this specification are set forth in the accompanying drawings and the description below. Other aspects, features, and advantages of the subject matter will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings:

FIG. 5B is an exemplary screenshot of a pop-up window on a position window of a graphical user interface on a display in accordance with the present disclosure.

FIG. 27 is an exemplary screenshot of a network resource setup window of a graphical user interface on a display in accordance with the present disclosure.

FIG. 28 is an exemplary screenshot of a project setup window of a graphical user interface on a display in accordance with the present disclosure.

DETAILED DESCRIPTION

Figure 1:
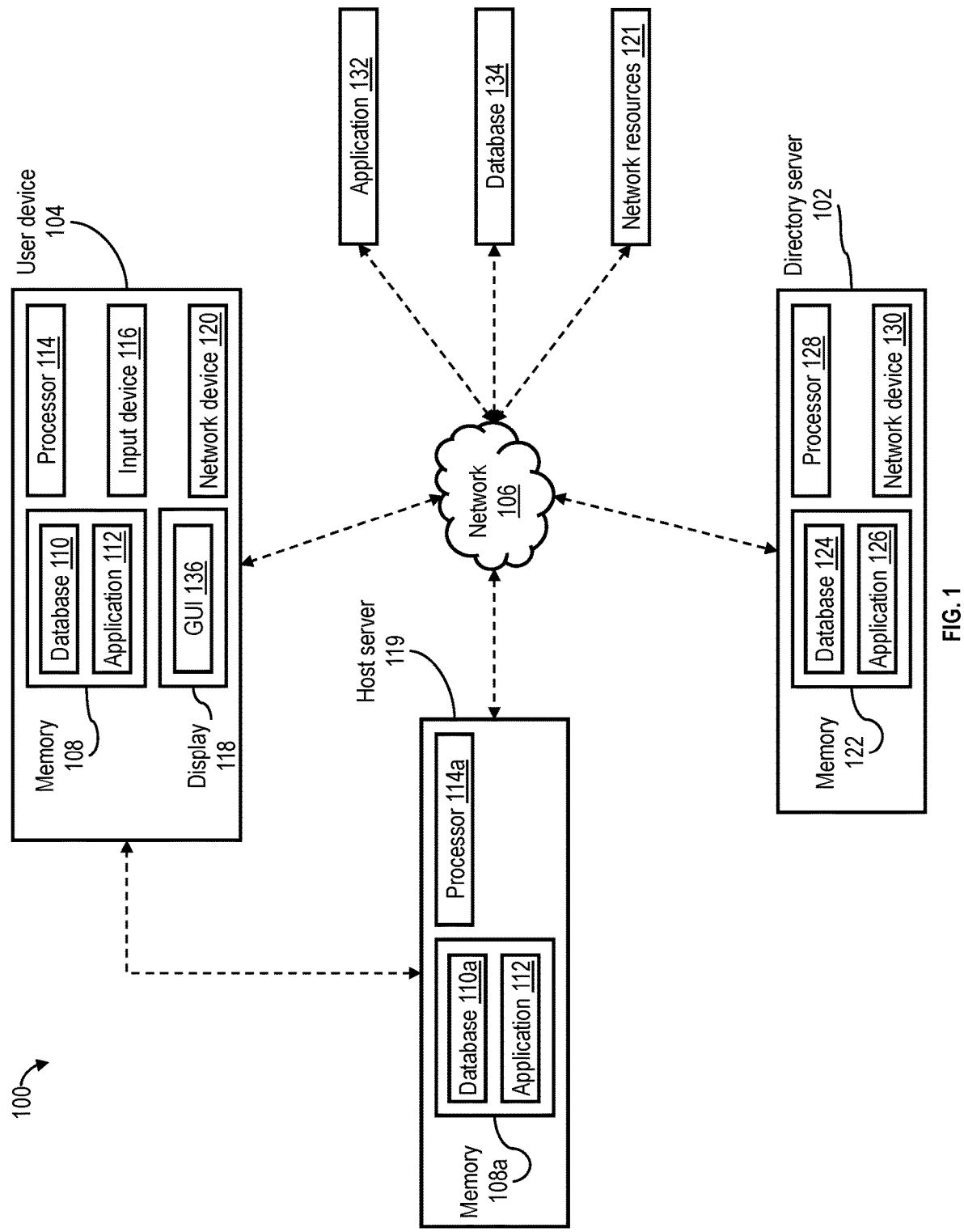
FIG. 1 is a block diagram of an exemplary embodiment of a computer system constructed in accordance with the present disclosure.

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary and not exhaustive. Also, it is to be understood that the phraseology and terminology employed herein is for the purpose of description and should not be regarded as limiting.

Headings are provided for convenience only and are not to be construed to limit the disclosure in any manner. Embodiments illustrated under any heading or in any portion of the disclosure may be combined with embodiments illustrated under the same or any other heading or other portion of the disclosure. Any combination of the elements described herein in all possible variations thereof is encompassed by the disclosure unless otherwise indicated herein or otherwise clearly contradicted by context.

Unless otherwise defined herein, scientific and technical terms used in connection with the presently disclosed inventive concept(s) shall have the meanings that are commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references that are cited and discussed throughout the present specification.

All patents, published patent applications, and non-patent publications mentioned in the specification are indicative of the level of skill of those skilled in the art to which this presently disclosed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the compositions, assemblies, systems, kits, and/or methods disclosed herein can be made and executed without undue experimentation in light of the present disclosure. While the compositions, assemblies, systems, kits, and methods of the inventive concept(s) have been described in terms of particular embodiments, it will be apparent to those of skill in the art that variations may be applied to the compositions and/or methods and in the steps or in the sequence of steps of the methods described herein without departing from the concept, spirit, and scope of the inventive concept(s). All such similar substitutions and modifications apparent to those skilled in the art are deemed to be within the spirit, scope, and concept of the inventive concept(s) as defined by the appended claims. In particular, where a method claim does not specifically state in the claims or description that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the terms "at least one" and "one or more" will be understood to include one as well as any quantity more than one, including but not limited to, 2, 3, 4, 5, 10, 15, 20, 30, 40, 50, 100, etc. The terms "at least one" and "one or more" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" or "one or more of X, Y, and Z" will be understood to include X alone, Y alone, and Z alone, as well as any combination of X, Y, and Z, including multiple Xs, Ys, and/or Zs. The use of ordinal number terminology (e.g., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," "one implementation," "an implementation", or "an example" means that a particular element, feature, structure, or characteristic described in connection with the embodiment is included in at least one embodiment. The appearance of the phrase "in some embodiments," "in some implementations," or "some examples" in various places in the specification is not necessarily all referring to the same embodiments, for example. Further, all references to one or more embodiments, implementations, or examples are to be construed as non-limiting to the claims.

Throughout this application, the term "about" is used to indicate that a value includes the inherent variation of error for a composition/apparatus/device, the method being employed to determine the value, or the variation that exists among the study subjects. For example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art. As used herein, qualifiers like "substantially," "about," "approximately," and combinations and variations thereof, are intended to include not only the exact amount or value that they qualify, but also some deviations therefrom, which may be due to mathematical accumulated error, manufacturing tolerances, measurement error, wear and tear, stresses exerted on various parts, and combinations thereof, for example.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the phrases "associated with" and "coupled to" include both direct association/binding of two components to one another as well as indirect association/binding of two components to one another.

As used herein, the term "organizational chart" refers to information pertaining to two or more positions belonging to an organization, and the relationship(s) between the two or more positions.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), a field programmable gate array (FPGA), a combination of hardware and software, and/or the like.

The term "processor" as used herein means a single processor or multiple processors working independently or together to collectively perform a task.

One or more processors may be implemented as a single processor or a system of multiple processors working together or independently to execute computer executable instructions as described herein. Exemplary embodiments of the processor(s) include a digital signal processor (DSP), a central processing unit (CPU), a field programmable gate array (FPGA), a microprocessor, a multi-core processor, and/or combinations thereof. The processor(s) may be capable of communicating with the one or more non-transitory computer readable media. It is to be understood that in certain embodiments where the one or more processors is a system of multiple processors, the multiple processors may be located remotely from one another, may be located in the same location, or may comprise a unitary multi-core processor. The one or more processors may be capable of reading and/or executing the computer executable instructions and/or of retrieving, creating, manipulating, altering, and/or storing computer data structures into the one or more non-transitory computer readable media, such as into one or more databases.

The term "one or more non-transitory computer readable media" may refer to one or more non-transitory computer readable media implemented as a conventional non-transitory memory, such as, for example, random access memory (RAM), a hard drive, a solid-state drive, a flash drive, a memory card, a non-transitory optical drive, and/or combinations thereof. The one or more non-transitory computer readable media may be implemented as a "cloud memory" (i.e., one or more non-transitory computer readable media may be partially or completely based on or accessed using a network). The one or more non-transitory computer readable media may be located in the same or in a different physical location than other computer system components. When located in a different physical location, the one or more non-transitory computer readable media may communicate with the other components, for example, via a network.

Turning now to the inventive concept(s), in general, certain non-limiting implementations include systems and methods for transforming organizational position changes from a user, or an external data source, into access permission changes by interfacing between a user and a directory server structured to manage access permissions for network resources, while eliminating the need for time-consuming, error-prone, and costly access permission changes that are structured in current systems. An interface application may allow the user to communicate with a directory server, such as via a network, to manage access permissions within a directory service domain based on positions within the organizational structure of an organization (i.e., position-access permissions), rather than on usernames.

In one implementation, an exemplary system comprises a non-transitory computer readable medium having computer executable instructions that when executed may cause a processor to: receive a first input from a user interface, the first input indicative of a username of a person to be associated or dissociated with a position within an organizational structure of an organization; and direct a directory server to assign the username to a position group within the directory server when the person is associated with the position and to remove the username from the position group when the person is dissociated with the position, thereby associating or dissociating correspondingly the position group with the person identified by the username, the position group associated with no more than one person at any one time, the directory server may store position-access permissions assigned to a plurality of permission groups, the plurality of permission groups containing no usernames, the position group may be associated with two or more permission groups of the plurality of permission groups, thereby assigning position-access permissions assigned to the two or more permission groups to the person associated with the position group or revoking the position-access permissions assigned to the two or more permission groups from the person dissociated with the position group.

In one implementation, an exemplary system comprises a non-transitory computer readable medium having computer executable instructions that when executed may cause a processor to: receive a first input from a user interface, the first input indicative of a new position within an organizational structure of an organization; direct a directory server to create a position group for the new position within the directory server, the directory server storing position-access permissions assigned to a plurality of permission groups, the plurality of permission groups containing no usernames; direct the directory server to nest the position group within two or more permission groups of the plurality of permission groups by assigning the position group as a member within each of the two or more permission groups; receive a second input from the user interface, the second input indicative of a username associated with the new position, the username may identify a person assigned to the new position within the organization; and direct the directory server to assign the username to the position group, thereby associating the position group with the person identified by the username, the position group may be associated with no more than one person at any one time, and thereby assigning the position-access permissions assigned to the two or more permission groups to the person associated with the position group. Various aspects of the present disclosure are provided in detail below.

Referring now to the drawings and in particular to FIG. 1, shown therein is a block diagram of an exemplary embodiment of a computer system 100 constructed in accordance with the present disclosure. The computer system 100 may include a directory server 102 (also referred to as a "name server" or a "domain controller") and one or more user devices 104. The directory server 102 and the one or more user devices 104 may be connected to, or be part of, a network 106. The directory server 102 and the one or more user devices 104 may be configured to communicate, for example, via the network 106. In some implementations, the computer system 100 may further comprise, and/or may be in bidirectional communication with, one or more host servers 119 connected to the network 106. The computer system 100 may include, and/or may be in bidirectional communication with, one or more network resources 121. The computer system 100 may include, and/or may be in bidirectional communication with, one or more external software applications 132 and/or one or more external databases 134.

The one or more user devices 104 may include one or more first non-transitory computer readable media 108. The one or more first non-transitory computer readable media 108 may store one or more databases 110 and/or interface computer executable instructions 112 (i.e., software code). The interface computer executable instructions 112 may be referred to herein as an interface application 112. The one or more user devices 104 may further comprise one or more processors 114, one or more input devices 116, one or more displays 118, and/or a network device 120 enabling the one or more user devices 104 to connect to the network 106.

The one or more user devices 104 may be implemented as a desktop computer, a laptop computer, a smartphone, a computer tablet, a computer kiosk, or other computing device, for example.

The one or more input devices 116 of the one or more user devices 104 may be configured to receive information directly from a user (such as a person or other computer system), the processors 114, and/or other components of the computer system 100 or external components, such as via the network 106. The one or more input devices 116 may be implemented as a keyboard, a touchscreen, a mouse, a trackball, a microphone, a fingerprint reader, an infrared port, a cell phone, a personal digital assistant (PDA), a controller, a network interface, speech recognition system, gesture recognition system, eye-tracking system, brain-computer interface system, and/or combinations thereof, for example.

The one or more displays 118 of the one or more user devices 104 may be configured to output information in a form perceivable by a user and/or the one or more processors 114 and/or other components of the computer system 100. The one or more displays 118 may be implemented as and/or be part of a computer monitor, a screen, a touchscreen, a speaker, a website, a television set, an augmented reality system, a smart phone, a personal digital assistant (PDA), a cell phone, a fax machine, a printer, a laptop computer, an optical head-mounted display (OHMD), a hologram, and/or combinations thereof, for example.

The interface application 112 may comprise program logic. The interface application 112 when executed by the one or more processors 114 may cause the one or more processors 114 to carry out one or more actions. For example, in some implementations, the interface application 112 may include a web browser and/or a native software application configured to communicate with the directory server 102 via the network 106. The interface application 112 may be configured to access a website and/or communicate information and/or data with the directory server 102 via the network 106. The interface application 112 may be configured to enable one or more users to indirectly interact with the directory server 102.

In some implementations, the interface application 112 may be stored partially or completely on one or more external non-transitory computer readable media 108a, such as located within the host server 119. The host server 119 may have one or more processors 114a and may be configured to communicate with the one or more user devices 104 and the directory server 102, directly and/or through the network 106. The host server 119 may store one or more databases 110a on the one or more external non-transitory computer readable media 108a. For simplicity, in describing how the interface application 112 is implemented, the one or more processors 114 of the one or more user devices 104 may be referred to interchangeably with the one or more processors 114a of the host server 119, but it will be understood that either or both may be used. Likewise, the one or more databases 110 of the one or more user devices 104 may be referred to interchangeably with the one or more databases 110a of the host server 119 but it will be understood that either or both may be used.

The interface application 112 may cause the one or more processors 114 to generate a graphical user interface 136. The graphical user interface 136 may be displayed on the display 118 of the one or more user devices 104.

The interface application 112 of the one or more user devices 104 and/or the host server 119 may be configured to enable one or more users to interact with the user interface 136 on the display 118 in order to transform user input that is based on employee organization into commands to the directory server 102, the commands indicative of structuring user access to the network resources 121. The one or more users may be people and/or other components of the computer system 100, such as, for example, the one or more external software applications 132 and the one or more external databases 134, and/or other computer systems.

Figure 2:
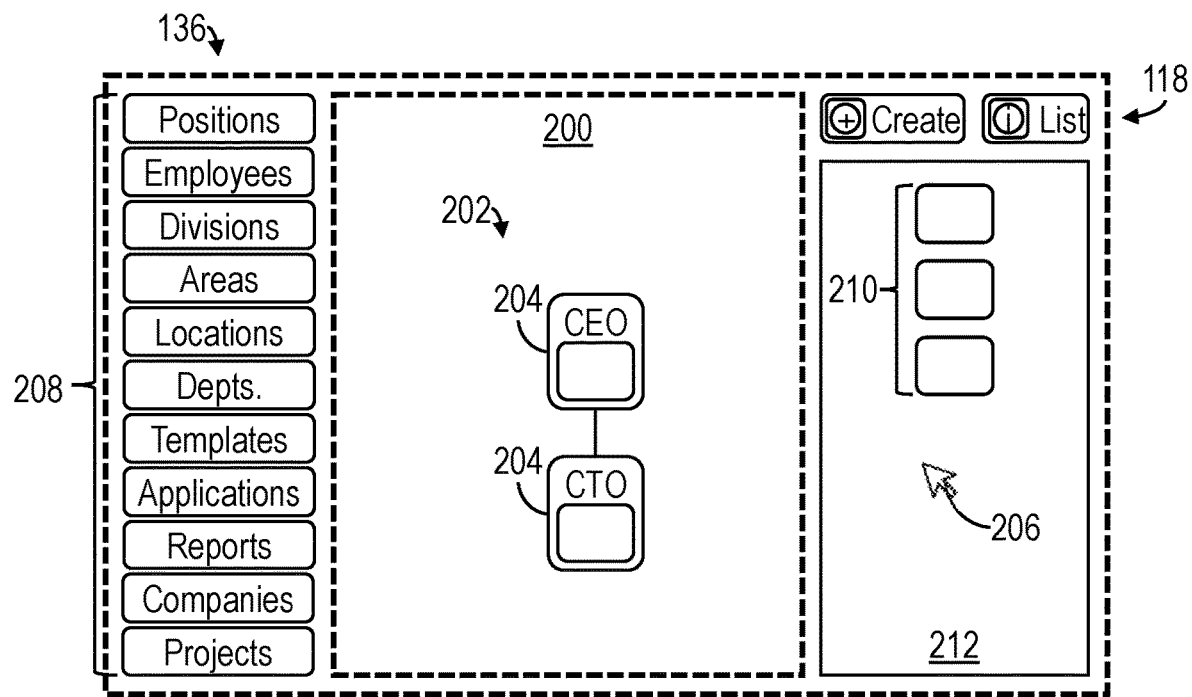
FIG. 2 is an exemplary screenshot of a graphical user interface on a display in accordance with the present disclosure.

As illustrated in FIG. 2, in some implementations, the graphical user interface 136 may include an organizational chart area 200 containing an organizational chart 202 depicting two or more positions 204 of employees within a real-world organization and relationship(s) between the two or more positions 204. The organizational chart 202 is editable, such that the positions 204 may be created, edited, moved, or deleted within the organizational chart 202. In some implementations, the graphical user interface 136 is configured to accept input from the user, such as by a user moving a cursor 206 for creating, editing, moving, or deleting the position(s) 204 within the organizational chart 202, such as via "drag and drop" techniques.

Though the cursor 206 is used by way of example to describe a configuration for user input throughout the description, in some implementations, the graphical user interface 136 may be configured to accept input from the user in additional or alternative other manners, non-exclusive examples of which include, through one or more touch screens, bodily movement interpretation devices, and/or verbal commands recognition devices.

In some implementations, the graphical user interface 136 may include the organizational chart 202 along with position-builder icons 208 indicative of options to define the one or more positions 204 within the organization. The graphical user interface 136 may be configured such that a user may select one or more position-builder icons 208, which provide corresponding group options 210 in a group option subwindow 212 for position-access for the positions 204 in the organizational chart 202. In some implementations, the user may assign one or more of the group options 210 to one or more of the positions 204 within the organizational chart 202 with the graphical user interface 136 on the display 118. In some implementations, the graphical user interface 136 is configured to accept input from the user moving the cursor 206 for assigning the group options 210 to the position(s) 204, such as via "drag and drop" methods. In some implementations, the graphical user interface 136 is configured to accept text input from the user for assigning the group options 210 to the position(s) 204. In some implementations, the group options 210 may be assigned to the positions 204 within the organizational chart 202 via other means, such as through the interface application 112 causing the one or more processors 114 to import information indicative of the group options 210 for one or more of the positions 204 without the use of the position-builder icons 208.

In some implementations, the group options 210 may segment, divide, and/or identify particular portions of the organization, such as structural subgroups of the organization in the real world. Nonexclusive examples of structural subgroups include companies, divisions, areas, locations, and/or departments of an organization. For example, a position-builder icon 208 may be designated as "Divisions" and associated ones of the group options 210 may include two or more subgroups of the organization that are predetermined as divisions.

In some implementations, the position-builder icons 208 may be associated with group options 210 that are indicative of reports and/or software applications for use by the position 204.

In some implementations, the position-builder icons 208 may be associated with group options 210 indicative of one or more lists of employees of the organization. In some implementations, the position-builder icons 208 may be associated with group options 210 indicative of templates (template groups 316a-n) and/or projects (project groups 317a-n), which includes predetermined combinations of group options 210 associated with other position-builder icons 208.

One or more of group options 210 may be utilized to filter other ones of the group options 210 to further specify user permissions, such as to access to a portion of all access for the group option 210. For example, a group option 210 associated with a particular one of the "Divisions" may be used to filter a group option 210 associated with a particular report, such that the report access is limited to user-permissions for reports having data about the particular one of the "Divisions" and/or limiting access within the reports to data about the particular one of the "Divisions".

Returning to FIG. 1, in one implementation, the network 106 may be the Internet and a user using the one or more user devices 104 may communicate with the interface application 112, such as on the host server 119, via the network 106 using a series of web pages.

The network 106 may be almost any type of network and may be implemented as the World Wide Web (or Internet), a local area network (LAN), a wide area network (WAN), a metropolitan network, a wireless network, a cellular network, a Global System for Mobile Communications (GSM) network, a code division multiple access (CDMA) network, a 3G network, a 4G network, a 5G network, a satellite network, a radio network, an optical network, a cable network, a public switched telephone network, an Ethernet network, and/or combinations thereof. It is contemplated that implementations of the present disclosure may use more advanced networking topologies.

The one or more network resources 121 may include, for example, one or more of software applications, network drives, and network peripherals. Non-exclusive examples of network peripherals may include printers, scanners, photocopiers, faxes, servers, computer stations, computer kiosks, and so on. In certain embodiments, each of the one or more network resources 121 may be provided with one or more categories. Non-exclusive examples of categories include accounting, sales, operations, marketing, finance, C-suite, payroll, human resources, and manufacturing. The categories may be used by a user or a interface-application system administrator (i.e., a user associated with a position with administrator access to the interface application 112) to filter the network resources 121 that are viewable in one or more of the application windows described herein. For example, one or more of the application windows may be provided with a category dropdown menu for selecting one of the categories. For example, selecting the "accounting" category from the category dropdown menu may filter out irrelevant network resources 121, leaving only the network resources 121 that are relevant to an "accounting" position (e.g., an accounting software application, a printer in the accounting physical area, and so on).

As illustrated in FIG. 1, the directory server 102 may include one or more second non-transitory computer readable media 122 and one or more processors 128. The one or more second non-transitory computer readable media 122 may store one or more databases 124 and/or directory computer executable instructions 126 (i.e., software code). The directory computer executable instructions 126 may be referred to herein as the directory service application 126. In some implementations, the directory server 102 may comprise a network device 130 enabling the directory server 102 to connect to the network 106.

In some implementations, the directory server 102 may be implemented using a server system having multiple servers. One or more of the multiple servers may be a virtual machine server. The multiple servers may or may not be located in a single physical location.

The one or more databases 124 of the directory server 102 may store, for example, a directory service domain 300, one or more usernames 306, one or more position groups 302, a plurality of permission groups 304a-n, position-access permissions 308, information regarding the network resources 121, and/or combinations thereof. The one or more databases 124 may store information regarding users, components of the computer system 100, and/or other computer hardware.

Figure 3:
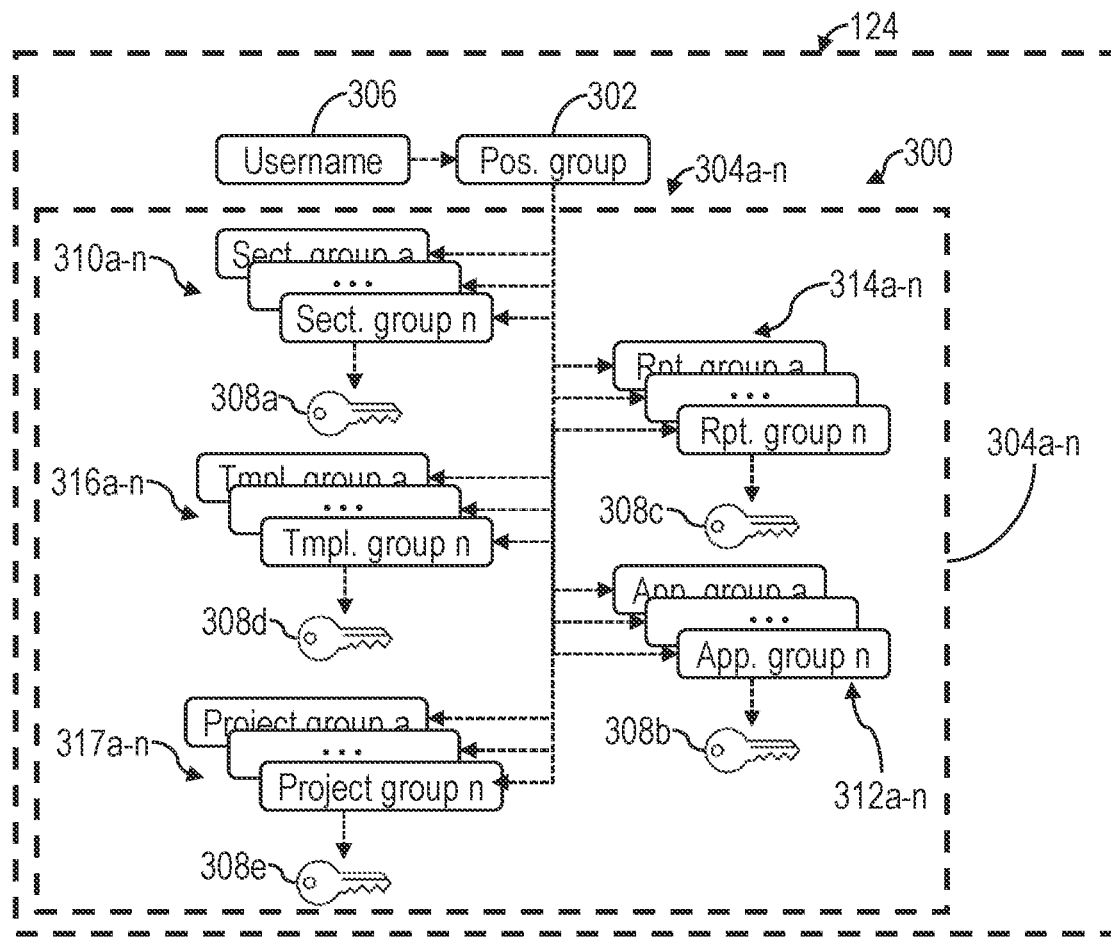
FIG. 3 is a block diagram of an exemplary embodiment of a directory service domain constructed in accordance with the present disclosure.

FIG. 3 illustrates a block diagram of an exemplary embodiment of a directory service domain 300 constructed in accordance with the present disclosure. As shown in FIG. 3, the directory service domain 300 may be a collection of objects stored in the one or more databases 124 and managed by the directory server 102. Nonexclusive examples of the objects include information indicative of the usernames 306, the position groups 302, the permission groups 304a-n, the network resources 121, and position-access permissions 308a-n (which may be referred to in the plural or in the singular). In some implementations, the one or more databases 124 of the directory server 102 may store one or more of: a schema defining which types of objects may be added to the directory service domain 300; a list of names for the objects added to the directory service domain 300; references and interrelations between the objects added to the directory service domain 300; and assignments of position-access permissions 308 to the plurality of permission groups 304a-n.

In the example shown in FIG. 3, the interface application 112 causes the one or more processors 114 to instruct the directory server 102 such that a position group 302 is nested within two or more permission groups 304a-n of a plurality of permission groups 304a-n by assigning the position group 302 as a member within each of the two or more permission groups 304a-n. The interface application 112 may cause the one or more processors 114 to assign a username 306 to (or dissociate a username 306 from) the position group 302, without directly assigning the username 306 to any permission group 304.

The position group 302 may be associated with a particular position 204 within an organizational structure of an organization (e.g., a "CEO" position group 302 may be associated with a position 204 identified as a "CEO"). The username 306 may identify a person assigned to the position 204 or associated with the position 204. The position group 302 may be associated with no more than one person (i.e., username 306) at any one time.

Each of the plurality of permission groups 304a-n may be associated with one or more of the position-access permissions 308 and/or may be configured to function as a repository for the position-access permissions 308. The plurality of permission groups 304a-n contain no usernames 306.

The position group 302 may be configured to function as a connection point between the username 306 and the two or more permission groups 304a-n. That is, the position group 302 being associated with no more than one person at a time, and the plurality of permission groups 304a-n containing no usernames 306, provide that the position-access permissions 308 are assigned to the position 204 associated with the position group 302, rather than the person identified by the username 306.

In some implementations, the plurality of permission groups 304a-n may include one or more permission groups 304 that correspond to the group options 210. For example, in some implementations, as shown in FIG. 3, the plurality of permission groups 304a-n may include one or more of: section groups 310a-n, software application groups 312a-n, report groups 314a-n, template groups 316a-n, and project groups 317a-n.

In some implementations, the section group(s) 310a-n may comprise position-access permissions 308a based on structural subgroups of the organization in the real world. Examples of the structural subgroups include companies, divisions, departments, areas, and geographic locations. The position-access permissions 308a assigned to the one or more section groups 310a-n may include position-access permissions 308 for accessing one or more of the network resources 121, such as network drives and/or one or more computer network peripherals, for example. The computer network peripherals may comprise network-connected devices, nonexclusive examples of which include one or more of network printers, network scanners, network photocopiers, and network faxes.

In some implementations, the software application group(s) 312a-n may comprise position-access permissions 308b for group members to access particular software applications. The report group(s) 314a-n may comprise position-access permissions 308c for group members to access one or more predetermined reports. The template group(s) 316a-n and/or the project groups 317a-n may comprise position-access permissions 308d, 308e for group members to access a combination of two or more of the predetermined reports and/or the particular software applications.

In some implementations, the one or more section groups 310a-n may be configured to limit the position-access permissions 308 available to each username 306 based on the group options 210 assigned to the position 204 to define the location of the position 204 in the structural subgroups of the organization in the real world. For example, the position group 302 associated with the corresponding position 204 may be a member of a permission group 304a-n (i.e., an application group 312a-n or a report group 314a-n) that is assigned position-access permissions 308 for a particular application or report. Nevertheless, because the position group 302 is a member of a particular section group 310a-n corresponding to the assigned group option 210, the contents of the particular report or application that are available to the position 204 may be limited to contents or portions specific to that assigned group option 210. The contents that are actually available to the user may include, for example, functionality or information that is specifically tailored to the structural subgroup.

In some implementations, though a position group 302 may be associated with a particular permission group 304a-n, the contents of a particular application or report that are available to a position 204 (and therefore to a user associated with the position 204) may be limited based on the position 204 of the user within the structural subgroups of the organization in the real world. That is, the position group 302 associated with the position 204 may be a member of a particular section group 310a-n that limits access of the user assigned to the position 204 to a particular application or report to, for example, functionality or information that is specifically tailored to the structural subgroup.

In some implementations, none of the plurality of permission groups 304a-n (such as the section groups 310a-n, the software application groups 312a-n, the report groups 314a-n, the template groups 316a-n, and the project groups 317a-n, for example) include the usernames 306. Rather, each position group 302 may contain up to one single username 306. Membership of the position group 302 within one or more of the plurality of permission groups 304a-n conveys position-access permissions 308 from the permission groups 304a-n through the position group 302 to the username 306 in the position group 302.

For example, in some implementations, adding the single username 306 to the position group 302 may assign all of the position-access permissions 308 of the permission groups 304a-n in which the position group 302 is a member to the username 306 in the position group 302. Removing the single username 306 from the position group 302 may remove all of the position-access permissions 308 of the permission groups 304a-n in which the position group 302 is a member from the username 306.

Returning now to FIG. 1, the directory service application 126 of the directory server 102 may comprise program logic which may include program logic to manage user access to the network resources 121, such as described above. For example, the directory service application 126 when executed by the one or more processors 128 of the directory server 102 may cause the one or more processors 128 to carry out one or more actions, including, for example, writing data to the one or more databases 124 of the directory server 102; reading data from the one or more databases 124; receiving, interpreting, and enacting commands from the interface application 112; maintaining a schema stored in the one or more databases 124 defining which types of objects (e.g., usernames 306, position groups 302, permission groups 304a-n, network resources 121, and position-access permissions 308) may be added to the directory service domain 300; adding objects to the directory service domain 300; deleting objects from the directory service domain 300; maintaining a list of names for the objects added to the directory service domain 300 to ensure that each is distinct; maintaining references and interrelations between the objects added to the directory service domain 300; maintaining the assignment of position-access permissions 308 associated with the plurality of permission groups 304a-n to one or more position groups 302; and responding to authentication requests from users allowing or disallowing access to the one or more network resources 121 based on the position-access permissions 308 assigned to the users because of their membership within the one or more position groups 302.

Exemplary methods of the computer system 100 in use will now be described. In one embodiment, the interface application 112 of the one or more user devices 104 and/or the host server 119, when executed, may cause the one or more processors 114 to receive position input from the user interface 136 regarding one or more positions 204 within an organization and transform the position input into directions to the directory server 102 to update user access based on the position group 302, which is nested in the one or more permission groups 304a-n, stored in the non-transitory computer readable media 122 of the directory server 102. In some implementations, the position input is received through an organizational chart 202 depicted in the user interface 136. In some implementations, the position input is received from the one or more external software applications 132 and/or the one or more external databases 134.

Figure 4:
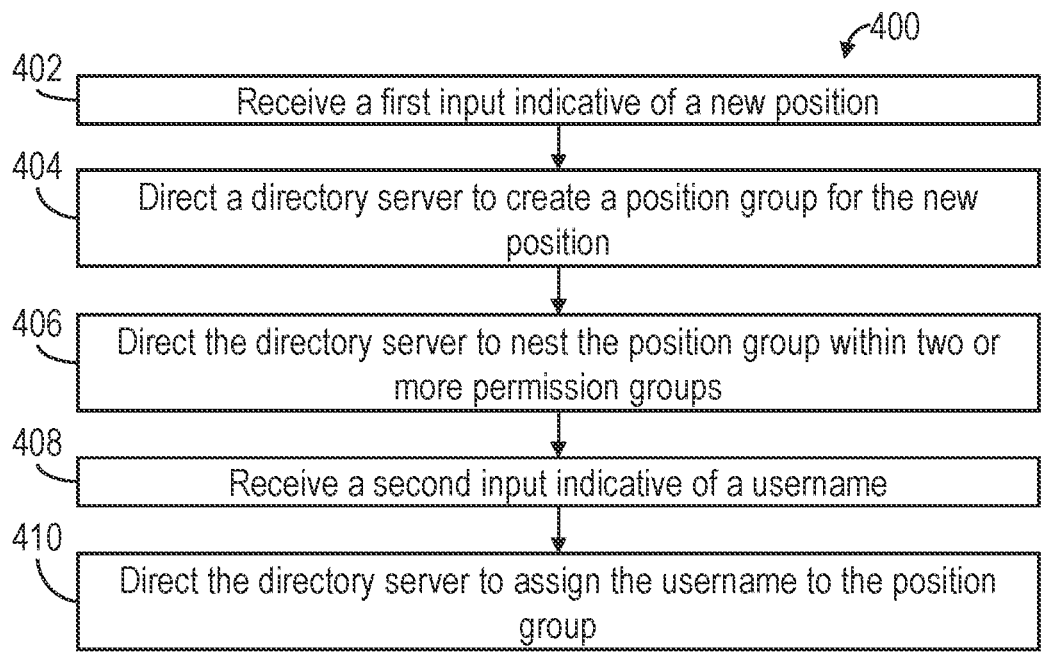
FIG. 4 is a process flow diagram of an exemplary embodiment of a computer-implemented method practiced in accordance with the present disclosure.

Referring now to FIG. 4, shown therein is a process flow diagram of an exemplary embodiment of a computer-implemented method 400 practiced in accordance with the present disclosure. The computer-implemented method 400 generally comprises the steps of: receiving a first input indicative of a new position 204 within an organization (step 402); directing the directory server 102 to create a corresponding position group 302 for the new position 204 (step 404); directing the directory server 102 to nest the position group 302 within the two or more permission groups 304a-n (step 406). The method may further comprise receiving a second input indicative of a particular username 306 of a person associated with the position 204 (step 408); and directing the directory server 102 to assign the username 306 to the position group 302 (step 410). It will be understood that two or more of the steps of the method 400 may be performed simultaneously or may be performed in sequence or may be performed with a time delay between the steps.

Figure 5A:
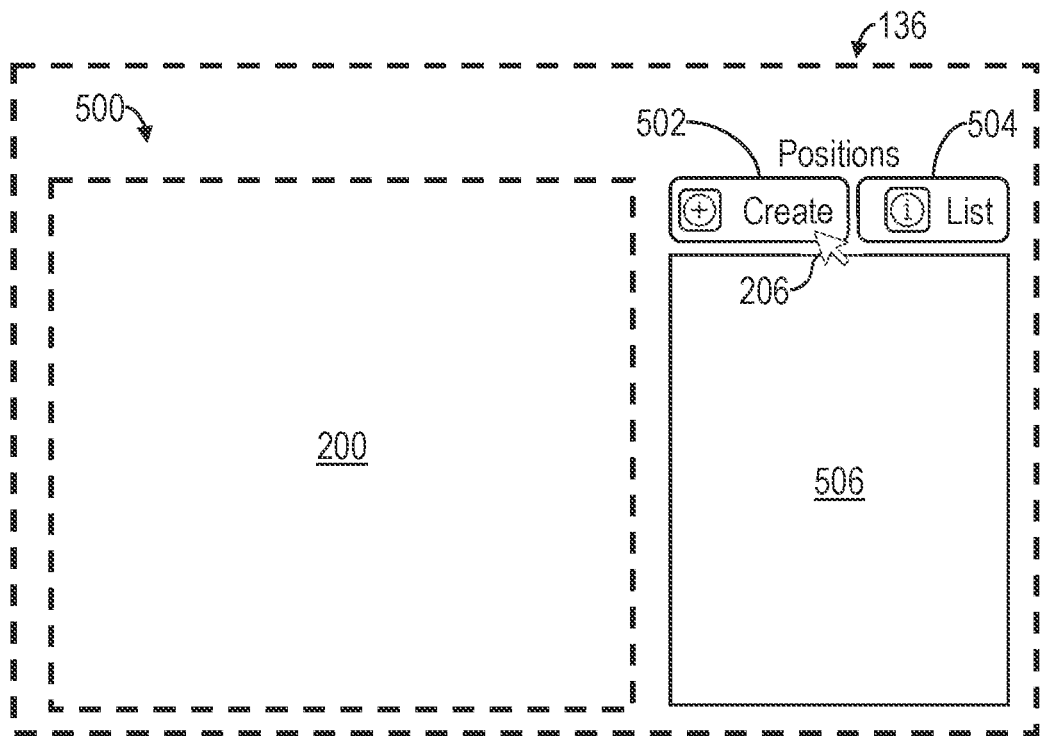
FIG. 5A is an exemplary screenshot of a position window of a graphical user interface on a display in accordance with the present disclosure.

As illustrated in FIG. 5A, the step of receiving the first input indicative of the new position 204 (step 402) may further comprise receiving, with one or more processors 114, a first input through the user interface 136, the first input indicative of the new position 204 within an organizational structure of an organization. The input may be received from a person, the one or more external software application 132, and/or the one or more external databases 134, for example.

In some implementations, the user interface 136 may include a position window 500 configured to accept the first input from a user. In some implementations, the position window 500 may include a create icon 502, a positions list icon 504, a position subwindow 506, and/or an organizational chart area 200.

The graphical user interface 136 may be configured to accept input from the user utilizing the input device 116 to move a cursor 206, for example, to various locations on the display 118 and select one or more elements depicted in the user interface 136. The create icon 502 may be configured to be selectable, such as by a user moving the cursor 206 over the create icon 502 and, upon being selected, to display an input screen, such as a pop-up window 510 (FIG. 5B) over the position window 500 on the display 118. Though the pop-up window 510 is used by way of example to describe a configuration for the input screen, in some implementations, the graphical user interface 136 may be configured to display the input screen in additional or alternative other manners (e.g., as an additional window). The positions list icon 504 may be configured to be selectable, such as by the user moving the cursor 206 over the positions list icon 504 and, upon being selected, to display a list of positions 204 when available.

The list of the positions 204 and/or information about the positions 204 may be stored in the one or more databases 110 of the user device 104, the one or more databases 110a of the host server 119, the one or more databases 124 of the directory server 102, and/or the one or more external databases 134.

Figure 6A:
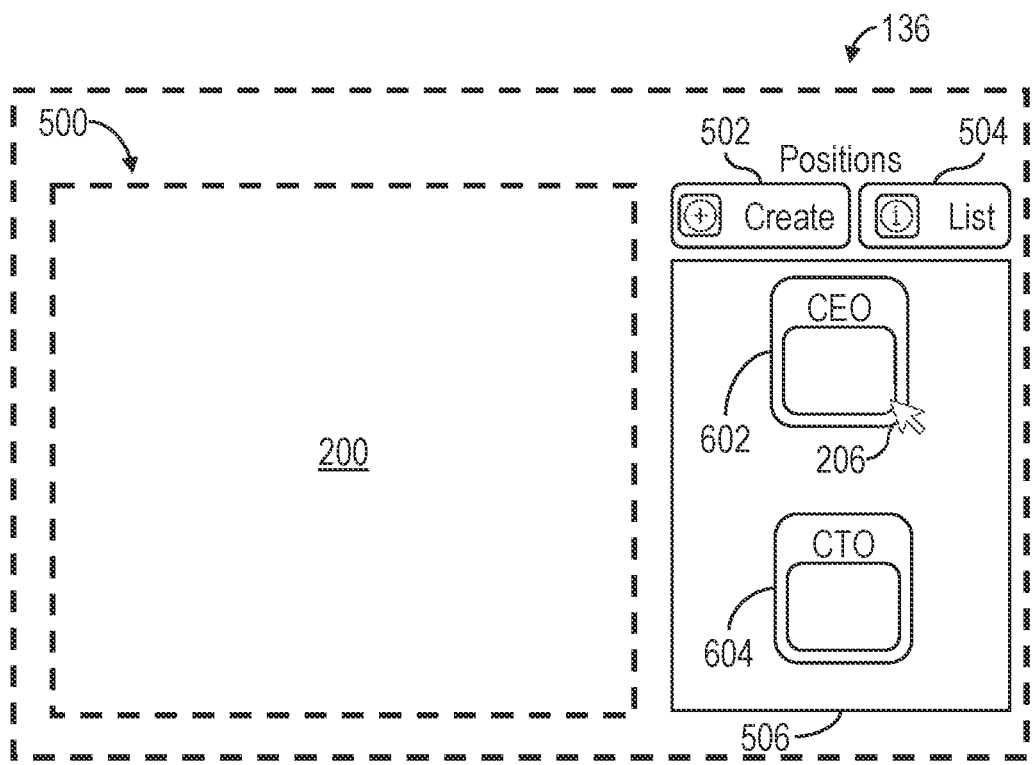
FIG. 6A is another exemplary screenshot of a position window of a graphical user interface on a display in accordance with the present disclosure.

The position subwindow 506 may be configured to display the one or more position icons (e.g., a first position icon 602 and a second position icon 604 as shown in FIG. 6A) indicative of the positions 204, such as from the list of the positions 204 and/or as new ones of the positions 204 are created. The organizational chart area 200 may be configured to display an organizational chart 202.

As shown in FIG. 5B, in some implementations the pop-up window 510 may be used to define group options 210 for the position 204. The pop-up window 510 may include one or more text fields 512a-n, a submit icon 514, and a cancel icon 516. The one or more text fields 512a-n may be configured to receive one or more of the group options 210 from the user utilizing the input device 116, the one or more inputs indicative of various descriptors (e.g., name, description, company, division, department, area, location, project, category) of the group options 210 for a new position 204 within the organizational structure of the organization. In some implementations, one or more of the one or more text fields is a dropdown menu.

In some implementations, the pop-up window 510 may further include one or more radio buttons 518a-n which may be used to define one or more position-access permissions 308 for the position 204, the one or more radio buttons 518a-n configured to receive one or more binary inputs from the user utilizing the input device 116. In some implementations, the one or more binary inputs are indicative of one or more software applications, one or more network resources, and/or one or more predetermined reports for which the position 204 is to be assigned position-access permissions 308. The one or more radio buttons 518a-n of the pop-up window 510 over the position window 500 may be similar in form and function to the one or more radio buttons 1516a-n of the pop-up window 1512 over the template window 1500, discussed in greater detail below.

In some implementations, the pop-up window 510 may further include a template dropdown menu 520 configured to receive a template from the user utilizing the input device 116. Responsive to the user selecting a template from the template dropdown menu 520, the interface application 112 may automatically select one or more of the radio buttons 518a-n corresponding to one or more position-access permissions 308 associated with the template. Responsive to the user de-selecting a first template from the template dropdown menu 520 (for example, by selecting a second template), the interface application 112 may automatically de-select the one or more radio buttons 518a-n corresponding to one or more position-access permissions 308 associated with the first template and then select the one or more radio buttons 518a-n corresponding to one or more position-access permissions 308 associated with the second template.

Figure 6B:
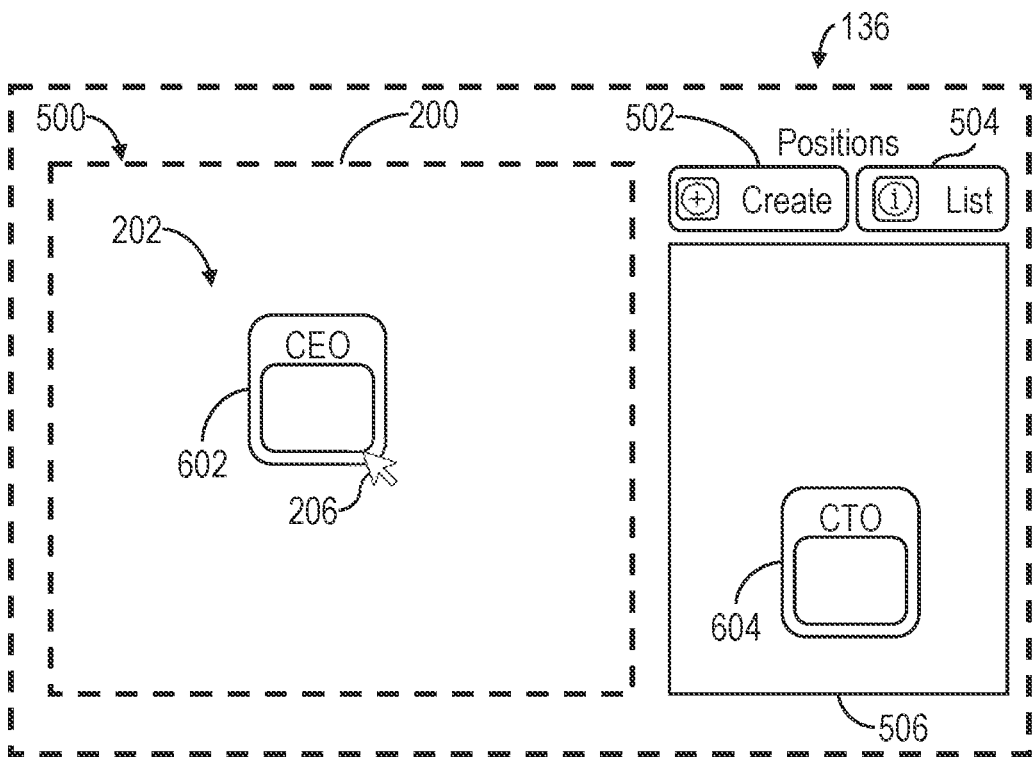
FIG. 6B is another exemplary screenshot of a position window of a graphical user interface on a display in accordance with the present disclosure.

Referring now to FIGS. 6A and 6B, in some implementations, the position subwindow 506 may display one or more position icons (e.g., the first position icon 602 and the second position icon 604) indicative of created ones of the positions 204. The first position icon 602 and the second position icon 604 may be configured to be selectable, such as by a user moving the cursor 206, for example, over the first position icon 602 and, upon being selected, to be movable by the user moving the cursor 206 and placeable in the organizational chart area 200, and thereby placeable in the organizational chart 202 (see FIG. 6B). In some implementations, upon the first position icon 602 being graphically placed by the user in the organizational chart area 200, the graphical user interface 136 may automatically update the organizational chart 202 by adding the first position icon 602 into the organizational chart 202 and displaying the organizational chart 202, including the first position icon 602, in the organizational chart area 200. The organizational chart 202 may be an interactive organizational chart.

The step of directing the directory server 102 to create the position group 302 for the new position (step 404) may further comprise the interface application 112 causing the one or more processors 114 to direct the directory server 102 to create the position group 302 for the new position 204 within the directory server 102.

As shown in FIG. 5B, in some implementations, the submit icon 514 may be configured to be selectable, such as by a user moving the cursor 206 over the submit icon 514 and, upon being selected, the interface application 112 may cause the one or more processors 114 to transmit (such as via the network 106) a signal indicative of query directing the directory server 102 to create the position group 302 for the new position 204, nest the position group 302 within the two or more permission groups 304a-n corresponding to the one or more inputs of the group options 210 received by the one or more text fields 512a-n (i.e., the one or more section groups 310a-n corresponding to, for example, the division, department, area, and/or location received by the one or more text field 512a-n), and store the position group 302 in the one or more databases 124 of the directory server 102. The cancel icon 516 may be configured to be selectable, such as by a user moving the cursor 206 over the cancel icon 516 and, upon being selected, to close the pop-up window 510 and display the position window 500 on the display 118. In one embodiment, the one or more inputs indicative of the new position 204 are received from the one or more external software applications 132 (e.g., a human resources software system) and/or the one or more external databases 134.

The step of directing the directory server 102 to nest the position group 302 within the two or more permission groups 304a-n (step 406) may further comprise the interface application 112 causing the one or more processors 114 to direct the directory server 102 to nest the position group 302 within two or more permission groups 304a-n of the plurality of permission groups 304a-n by assigning the position group 302 as a member within each of the two or more permission groups 304a-n. The plurality of permission groups 304a-n may be assigned the position-access permissions 308 and contain no usernames 306.

Figure 7A:
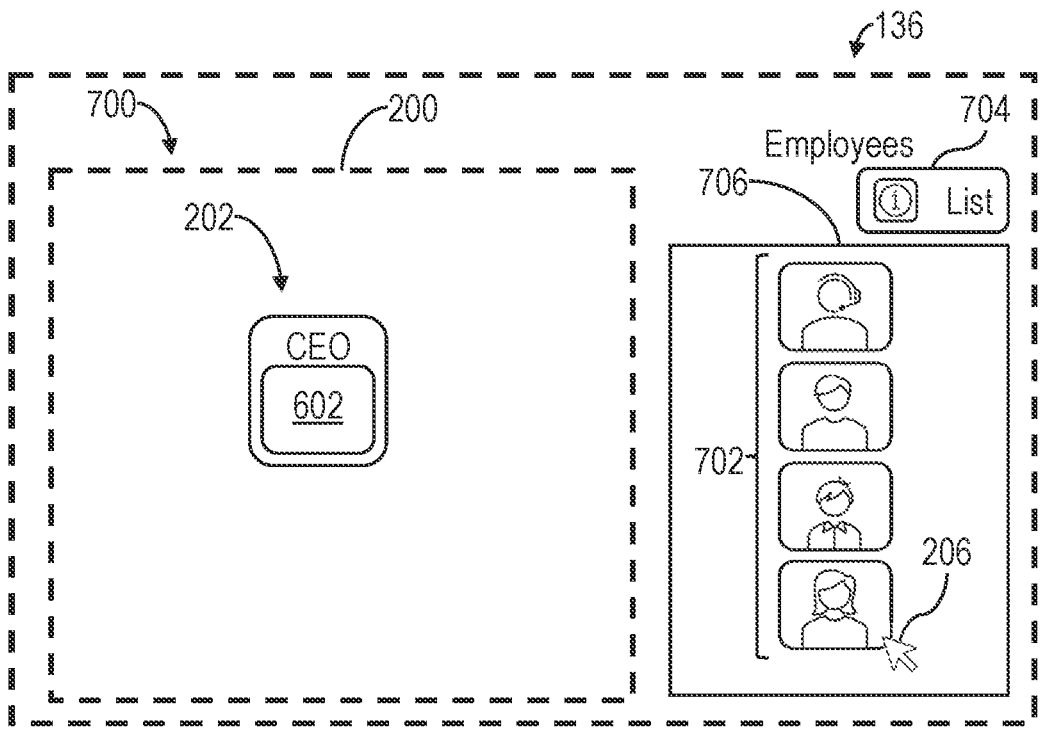
FIG. 7A is an exemplary screenshot of an employee window of a graphical user interface on a display in accordance with the present disclosure.
Figure 7B:
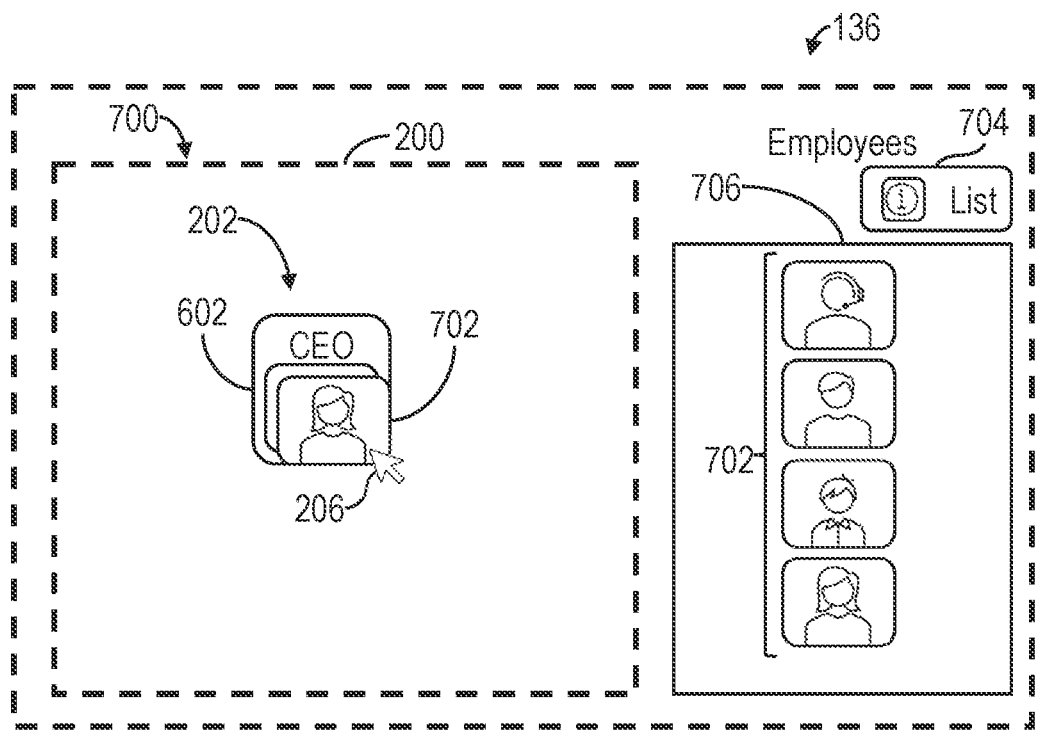
FIG. 7B an exemplary screenshot of an employee window of a graphical user interface on a display in accordance with the present disclosure.

As illustrated in FIGS. 7A and 7B, the step of receiving the second input indicative of the username 306 (step 408) may further comprise receiving, with the one or more processors 114, a second input from the user interface 136, the second input indicative of a username 306 associated with the new position 204, the username 306 identifying a person assigned to the new position 204 within the organization.

In some implementations, the user interface 136 may include an employee window 700. The employee window 700 may include an employee list icon 704, an employee subwindow 706, and the organizational chart area 200, for example. The employee list icon 704 may be similar in form and function to the positions list icon 504, except that, upon being selected, the employee list icon 704 may be configured to display a list of employees associated with corresponding ones of the one or more usernames 306. The employee subwindow 706 may be configured to display one or more employee icons 702 indicative of employees from the list of employees. The employee list(s) and/or the one or more usernames 306 may be stored in one or more of: the one or more databases 110 of the user device 104, the one or more databases 110a of the host server 119, the one or more databases 124 of the directory server 102, and the one or more external databases 134. In some implementations, the list of employees and/or the one or more usernames 306 may be entered into the one or more databases 110, 110a and/or imported from the one or more external databases 134 into the one or more databases 110, 110a of the user device 104 and/or the host server 119.

In some implementations, the one or more employee icons 702 may be configured to be selectable, such as by a user moving the cursor 206 over the one or more employee icons 702 and, upon being selected, to be movable by the user moving the cursor 206 and placeable in the organizational chart area 200 on a position icon 602, such as by using "drag and drop" methods, for example, thereby assigning the person associated with the employee icon 702 to the position 204 associated with the position icon 602.

The step of directing the directory server 102 to assign the username 306 to the position group 302 (step 410) may further comprise the interface application 112 causing the one or more processors 114 to direct the directory server 102 to assign the username 306 to the position group 302, thereby associating the position group 302 with the person identified by the username 306, the position group 302 associated with no more than one person at any one time, and thereby assigning the position-access permissions 308 assigned to the two or more permission groups 304a-n to the person associated with the position group 302.

In some implementations, upon an employee icon 702 being placed in the organizational chart area 200 on a position icon 602, the interface application 112 may cause the one or more processors 114 to transmit via the network 106 a signal indicative of a query directing the directory server 102 to assign the username 306 associated with the employee icon 702 to the position group 302 associated with the position icon 602. Assigning the username 306 to the position group 302 may have the effect of assigning the position-access permissions 308 within the two or more permission groups 304a-n to the username 306 based on membership of the username 306 within the position group 302.

Figure 8:
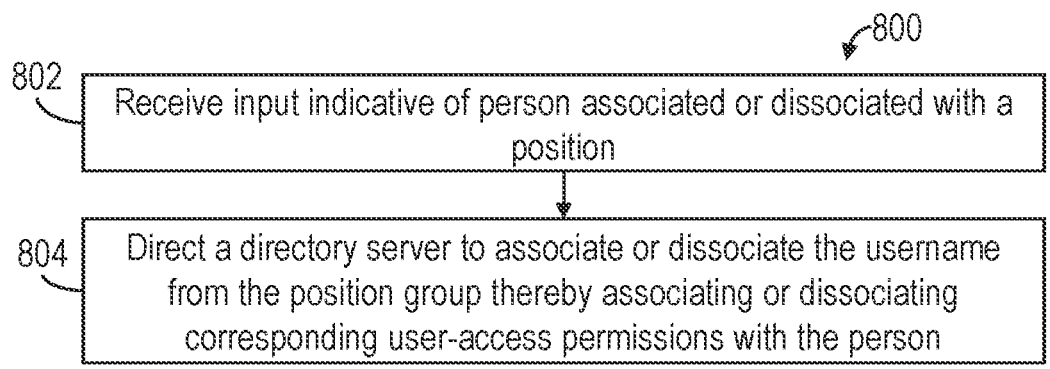
FIG. 8 is a process flow diagram of an exemplary embodiment of a computer-implemented method for associating or dissociating a person with an existing position practiced in accordance with the present disclosure.

FIG. 8 illustrates an exemplary computer-implemented method 800 for associating or dissociating a person with an existing position 204. In a step 802, the interface application 112 may receive from a user input indicative of person associated or dissociated with a position 204. The user may be a person and the input may be received via the user interface 136 and/or the user may be the one or more external software applications 132 or external databases 134, for example. In a step 804, the interface application 112 may cause the one or more processors 114 to direct the directory server 102 to associate or dissociate the username 306 from the position group 302, thereby associating or dissociating corresponding position-access permissions 308 assigned to the permission groups 304a-n in which the position group 302 is nested with the person.

In one implementation, as shown in FIG. 7B, the one or more employee icons 702, upon being placed in the organizational chart area 200 on the position icon 602, may be configured to be selectable, such as by a user moving the cursor 206 over the one or more employee icons 702 and, upon being selected, to be movable by the user moving the cursor 206 and placed outside of the organizational chart area 200. Upon an employee icon 702 being removed from the position icon 602 and the organizational chart area 200, the interface application 112 may cause the one or more processors 114 to transmit via the network 106 a signal indicative of a query directing the directory server 102 to dissociate the username 306 associated with the employee icon 702 from the position group 302 associated with the position icon 602. Dissociating the username 306 from the position group 302 may revoke the position-access permissions 308 assigned to the permission groups 304a-n in which the position group 302 is nested from the username 306.

Inputs received by the interface application 112 (through the graphical user interface 136 or external sources) may automatically be used by the interface application 112 to cause the one or more processors 114, 114a to update the organizational chart 202 by adding the username 306 to the first position icon 602 or removing the username 306 from the first position icon 602, and displaying the organizational chart 202, so updated, in the organizational chart area 200. In one embodiment, the one or more inputs indicative of the username 306 to be associated with or dissociated from the new position 204 is received from the one or more external software applications 132 (e.g., a human resources software system) and/or the one or more external databases 134 (e.g., employee databases).

Figure 9:
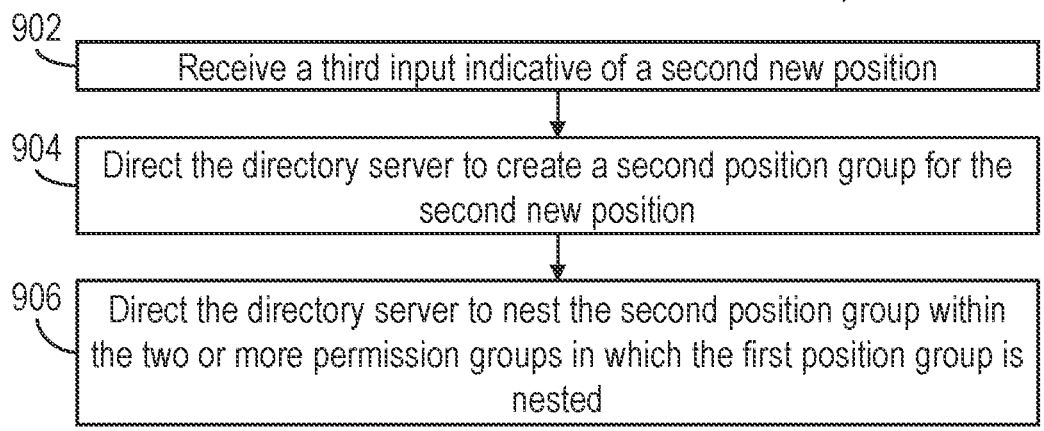
FIG. 9 is a process flow diagram of an exemplary embodiment of a computer-implemented method for adding additional positions to the organizational chart practiced in accordance with the present disclosure.

FIG. 9 illustrates an exemplary computer-implemented method 900 in accordance with the present disclosure for adding additional ones of the positions 204 to the organizational chart 202. In a step 902, the interface application 112 may cause the one or more processors 114 to receive a third input indicative of a second new position 204; in a step 904, the interface application 112 may cause the one or more processors 114 to direct the directory server 102 to create a second position group 302 for the second new position 204. In some implementations, in a step 906, the interface application 112 may cause the one or more processors 114 to direct the directory server 102 to nest the second position group 302 within the two or more permission groups 304a-n in which the first position group 302 is nested.

Figure 10A:
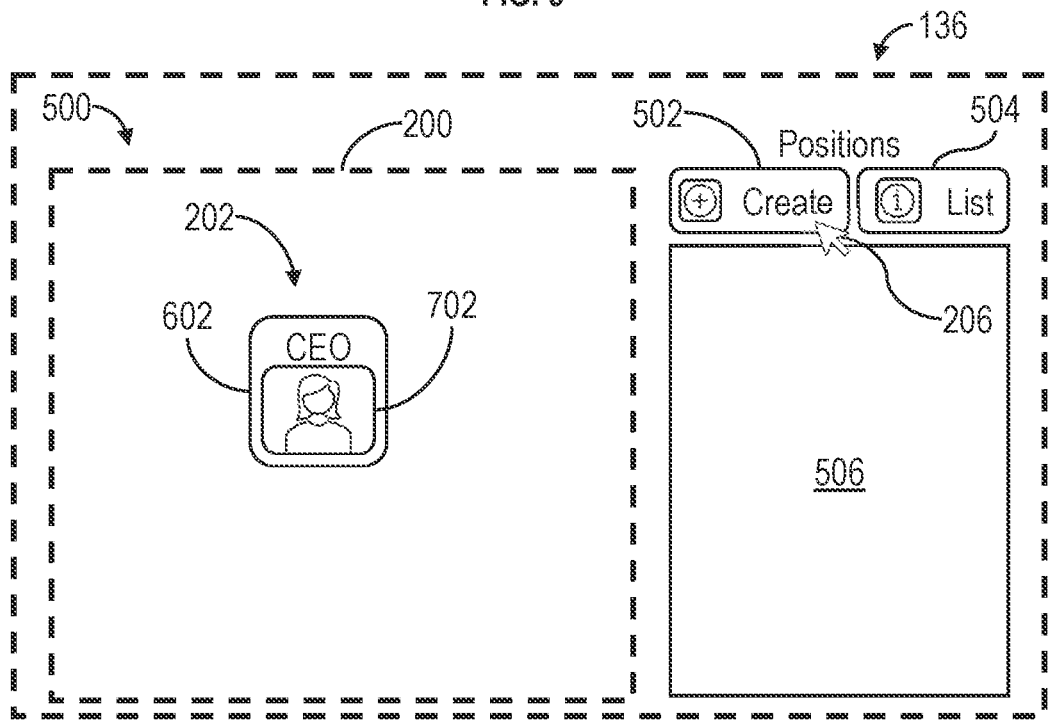
FIG. 10A is another exemplary screenshot of a position window of a graphical user interface on a display in accordance with the present disclosure.
Figure 10B:
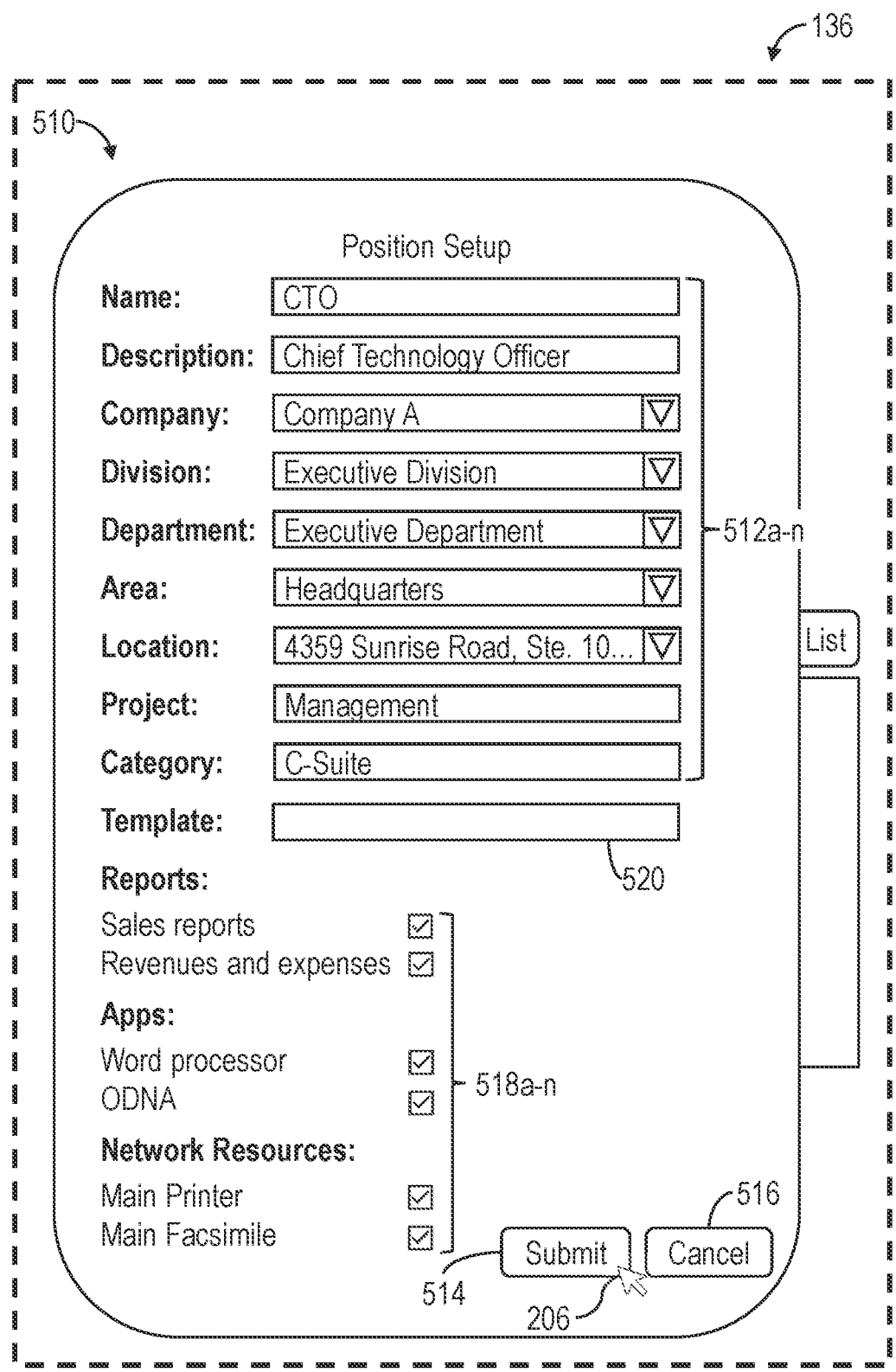
FIG. 10B is another exemplary screenshot of a pop-up window on a position window of a graphical user interface on a display in accordance with the present disclosure.

For example, referring now to FIGS. 10A and 10B, upon a position group 302 being created for the first new position 204, the position window 500 may be configured to allow a user to define and create one or more additional positions 204 (or edit the first new position 204 previously created) in a manner similar to that previously described for defining and creating the first new position 204.

Figure 11A:
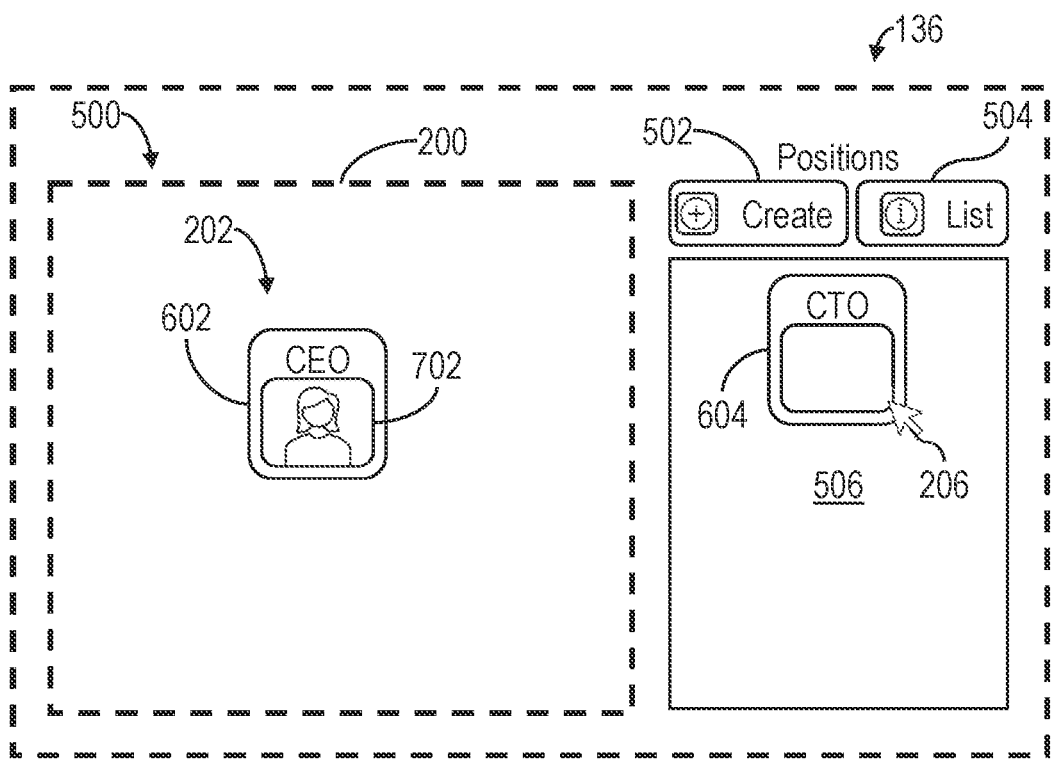
FIG. 11A is another exemplary screenshot of a position window of a graphical user interface on a display in accordance with the present disclosure.
Figure 11B:
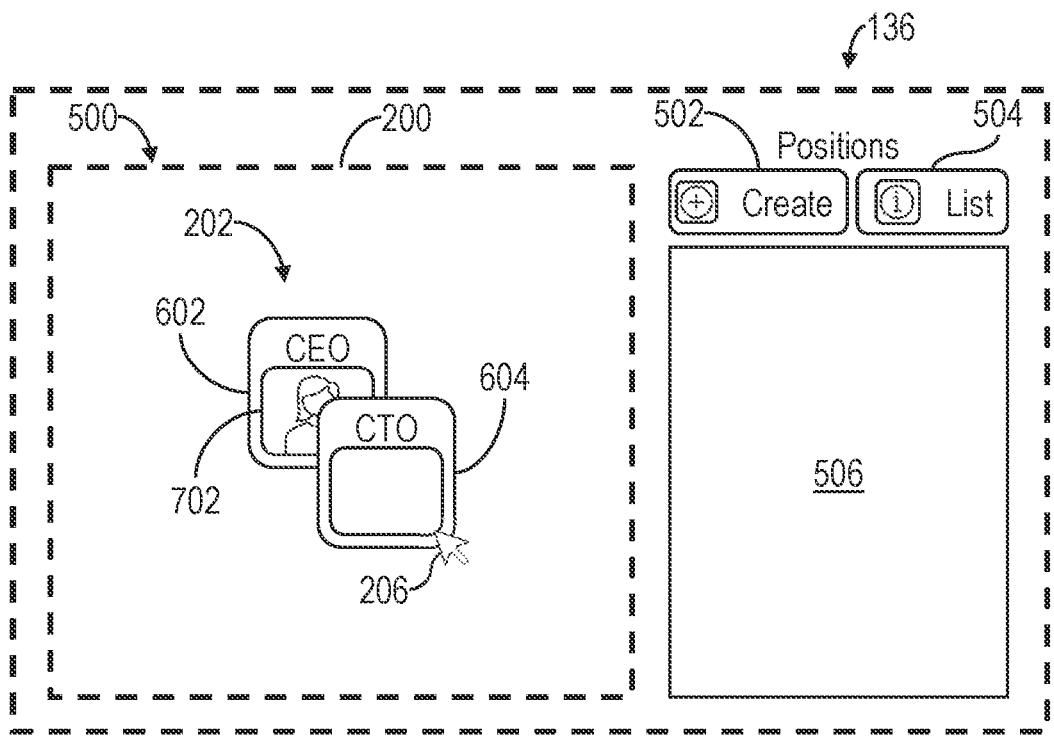
FIG. 11B is another exemplary screenshot of a position window of a graphical user interface on a display in accordance with the present disclosure.

As illustrated in FIGS. 11A and 11B, in some implementations, the position subwindow 506 may display the second position icon 604. In some implementations, the position subwindow 506 may display the second position icon 604 in response to the second position 204 being created. The second position icon 604 may be configured to be selectable, such as by a user moving the cursor 206 over the second position icon 604 and, upon being selected, to be movable by the user moving the cursor 206 and placeable in the organizational chart area 200 on the first position icon 602, and thereby placeable in the organizational chart 202 such that the second position icon 604 is in a relationship with the first position icon 602 that is indicative of the relationship between the first position 204 and the second position 204. For example, the second position icon 604 may be subordinate the first position icon 602, and such that first position 204 associated with the first position icon 602 represents a supervisory position 204 to the second position 204.

In some implementations, the interface application 112 may cause the one or more processors 114 to store relationship information indicative of the supervisory and/or subordinate relationships of the positions 204 to one another in the one or more databases 110 and/or the one or more external databases 134. Changes to the organizational chart 202 may be stored in the one or more databases 110 and/or the one or more external databases 134.

In some implementations, upon the second position icon 604 being placed in the organizational chart area 200 in relation to the first position icon 602, the interface application 112 may cause the one or more processors 114 to transmit (such as via the network 106) a signal indicative of a query directing the directory server 102 to nest the position group 302 for the second position 204 within the same one or more permission groups 304a-n as those associated with the position group 302 for the first new position 204.

Figure 12A:
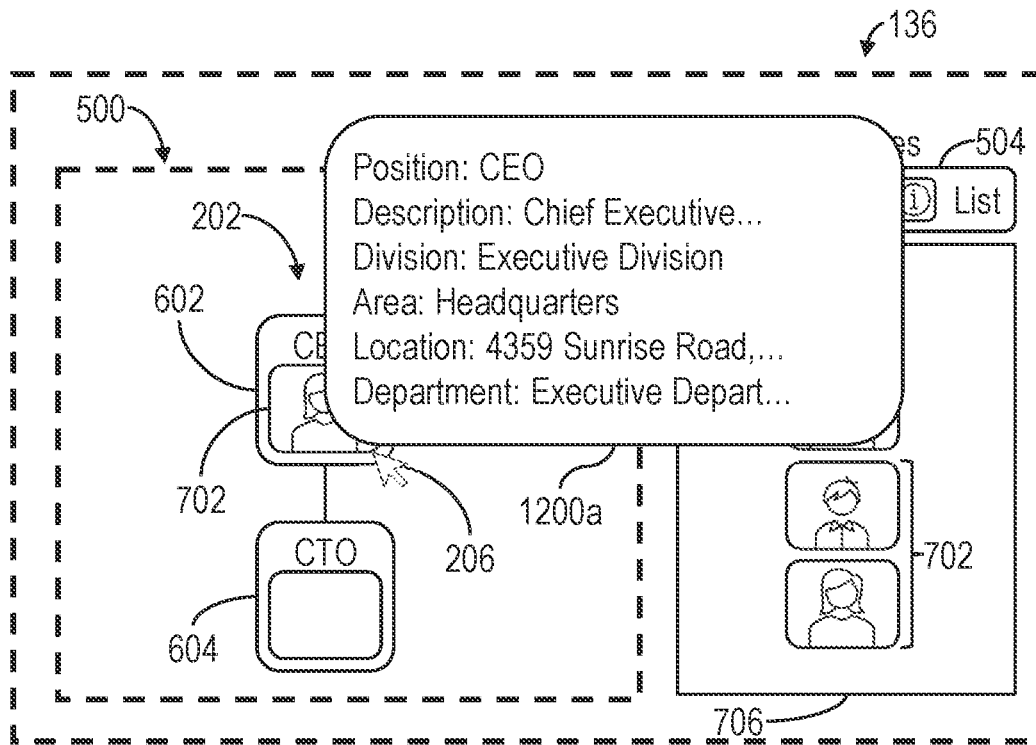
FIG. 12A is another exemplary screenshot of an employee window of a graphical user interface on a display in accordance with the present disclosure.
Figure 12B:
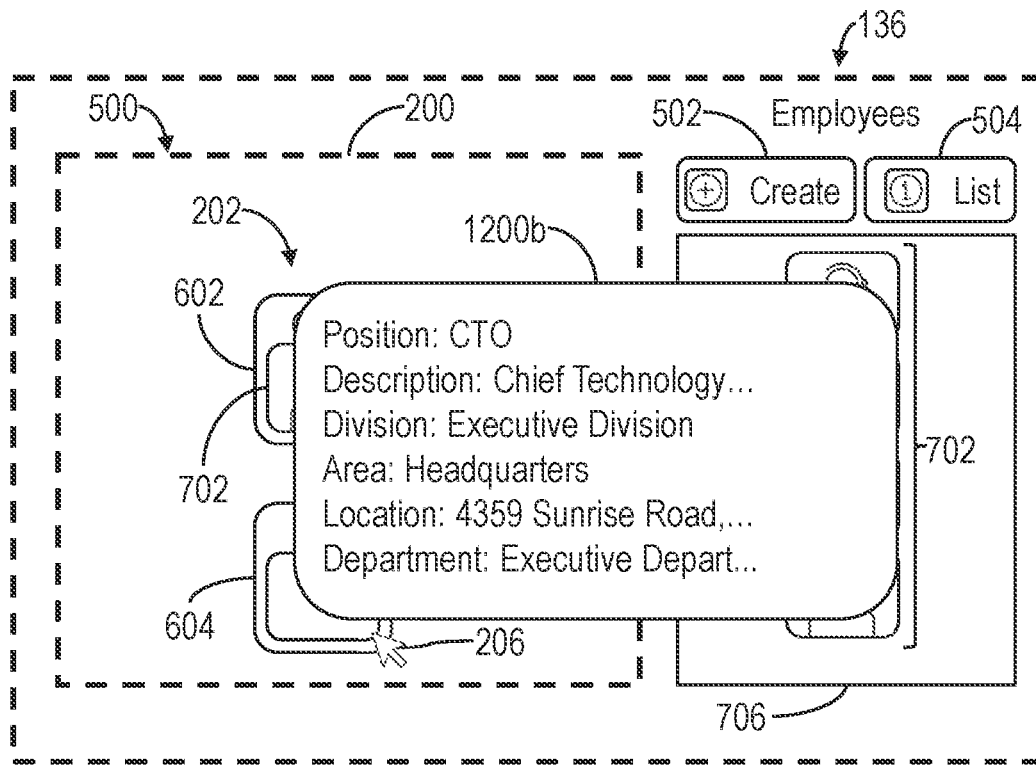
FIG. 12B is another exemplary screenshot of an employee window of a graphical user interface on a display in accordance with the present disclosure.

In some implementations, as shown in FIGS. 12A and 12B, the first position icon 602 may be configured to display a first position tooltip 1200a on the display 118, such as upon the user moving the cursor 206 near the first position icon 602. The first position tooltip 1200a may display the various descriptors corresponding to the group options 210 for the first position 204. Additionally, the second position icon 604 may be configured to display a second position tooltip 1200b on the display 118, such as upon the user moving the cursor 206 near the second position icon 604. The second position tooltip 1200b may display the various descriptors corresponding to the group options 210 for the second position 204. In this example, the position group 302 for the second position 204 and the position group 302 for the first position 204 are associated with the same group options 210.

In some implementations, the one or more positions 204 may be editable such that the group options 210 associated with the one or more positions 204 may be added, updated, changed, or deleted. In some implementations, one or more of the group options 210 associated with a particular position 204 may be the same as the group options 210 associated with a supervisory position 204 to the particular position 204. In some implementations, one or more of the group options 210 associated with the particular position 204 may differ from the group options 210 associated with the supervisory position 204 to the particular position 204.

For example, in some implementations, upon being placed in the organizational chart area 200, the one or more position icons (e.g., the first position icon 602 and the second position icon 604) may be configured to be selectable, such as by a user moving the cursor 206 over the one or more position icons 602, 604 and, upon being selected, to allow editing of the group options 210 of the position 204.

In some implementations, the interface application 112 may display a position edit screen over the window (e.g., the position window 500, the employee window 700, and/or the template window 1500) on the display 118. The position edit screen may be similar in form and function to the input screen (e.g., the pop-up window 510 shown in FIG. 5B), and/or the one or more text fields 512a-n may be pre-filled with the various descriptors (e.g., the name, the description, the division, the department, the area, and the location) for the position 204, and the position edit screen may be configured to allow a user to edit one or more of the various descriptors of the group options 210.

The one or more text fields 512a-n may be configured to receive one or more inputs indicative of a change to the group options 210 (e.g., a new name, a new description, a new department, a new area, and/or a new location). In response to the change (such as in response to the submit icon 514 being selected), the interface application 112 may cause the one or more processors 114 to transmit (such as via the network 106) a signal indicative of a query directing the directory server 102 to remove the position group 302 from the two or more permission groups 304a-n corresponding to the original group options 210 and to nest the position group 302 within the two or more permission groups 304a-n corresponding to the new group options 210.

Figure 13:
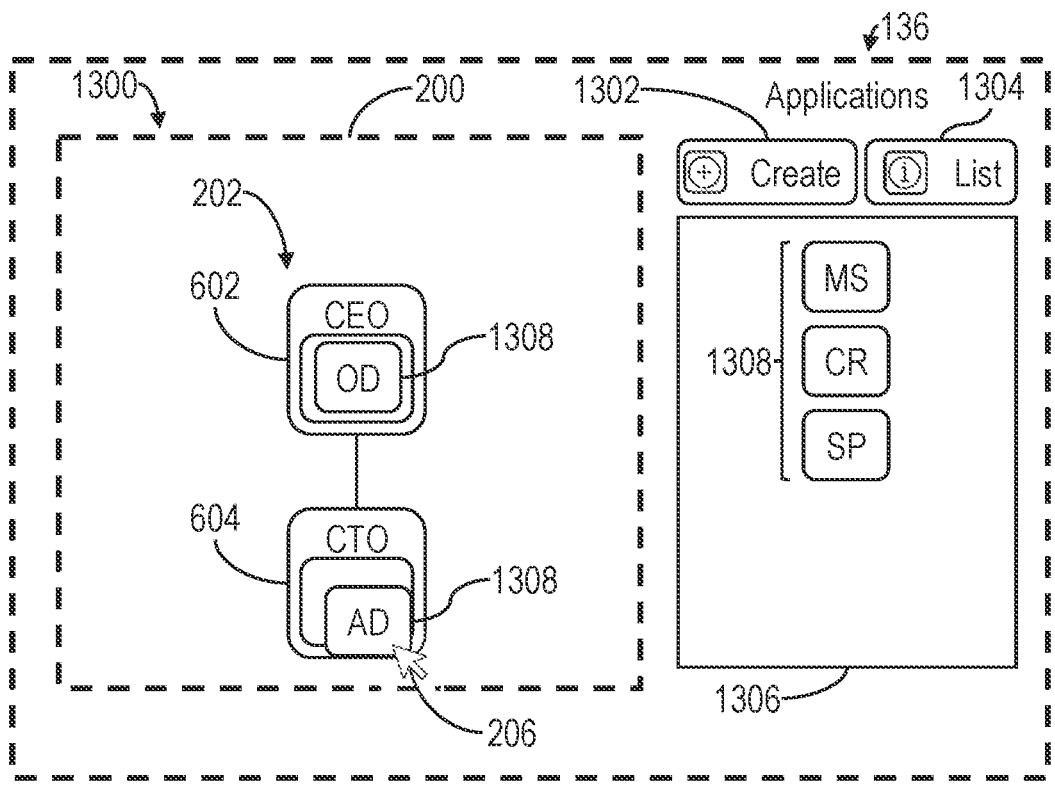
FIG. 13 is an exemplary screenshot of an application window of a graphical user interface on a display in accordance with the present disclosure.
Figure 14:
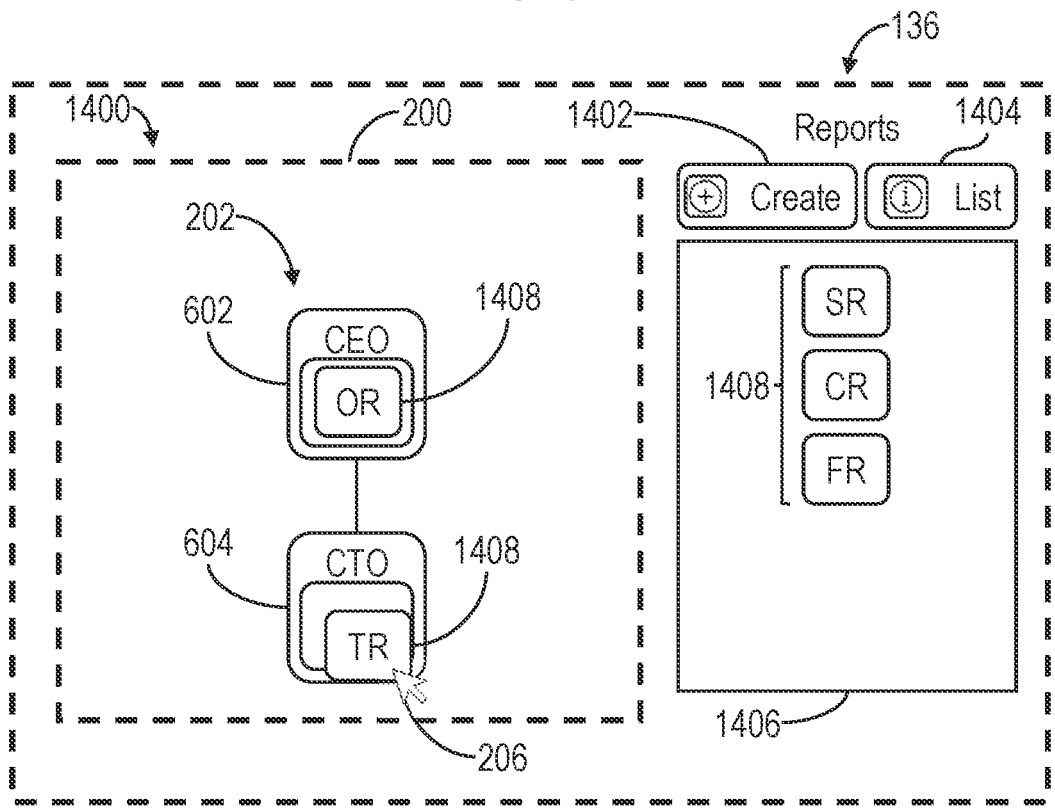
FIG. 14 is an exemplary screenshot of a report window of a graphical user interface on a display in accordance with the present disclosure.

In some implementations, creating or editing a position 204 may include assigning position-access permissions 308b, 308c for accessing one or more software applications and/or one or more reports to the position 204 (or removing the position-access permissions 308b, 308c therefrom). For example, as shown in FIGS. 13 and 14, one or more application icons 1308 and/or one or more report icons 1408 may be configured to be selectable, such as by a user moving the cursor 206 over the one or more application icons 1308 and/or the one or more report icons 1408 and, upon being selected, to be movable by the user, such as by moving the cursor 206, and placeable in the organizational chart area 200 on a position icon 602, such as via "drag and drop" methods, for example, thereby assigning the position-access permissions 308b, 308c associated with the one or more application icons 1308 and/or the one or more report icons 1408 to the position 204 associated with the position icon 602. In some implementations, the graphical user interface 136 may be configured to receive input from a user for assigning the position-access permissions 308 for the software applications and/or reports to the position(s) 204 through text fields and/or selection fields.

For example, as shown in FIG. 13, in some implementations, the user interface 136 may include an application window 1300. The application window 1300 may include, for example, a create icon 1302, an application list icon 1304, an application subwindow 1306, and the organizational chart area 200. The interface application 112 when executed may cause the one or more processors 114 to cause the graphical user interface 136 on the display 118 to display the application icons 1308 in the application subwindow 1306 representing corresponding software applications. In this example, five application icons 1308 are shown, but it will be understood that any number of application icons 1308 may be displayed, such as determined by the user and/or added via a create icon 1302. The create icon 1302 may be configured to be selectable, such as by a user moving the cursor 206 over the create icon 1302 and, upon being selected, to display an input screen, such as an application definition window 1900b (FIG. 19B) over the application window 1300 on the display 118. The application list icon 1304 may be configured to be selectable, such as by the user moving the cursor 206 over the application list icon 1304 and, upon being selected, to display a list of applications when available.

The interface application 112 may cause the one or more processors 114 to receive input from the user indicative of software applications assigned to one or more of the positions 204, such as the positions 204 associated with the first position icon 602 and the second position icon 604. The assignment of the software applications may be through drag-and-drop, pop-up box interface, text entry, and/or other input methods. The interface application 112 may then cause the one or more processors 114 to direct the directory server 102 to assign the position group 302 for the corresponding position 204 to the application group(s) 312a-n corresponding to the software applications assigned through the user interface 136 to the position 204. Assigning the position group 302 to the application group(s) 312a-n may cause position-access permissions 308 assigned to the application group(s) 312a-n to be assigned to the position group 302. Nonexclusive examples of software applications include word processing software, spreadsheet software, pdf editing or viewing software, the interface application 112, human resource management software, website management or creation software, drafting software, data management software, specialty software, bespoke software, manufacturing software, production software, supply chain software, electronic health record software, and software suites.

Similarly, in the example shown in FIG. 14, in some implementations, the user interface 136 may include a report window 1400. The report window 1400 may include a create icon 1402, a report list icon 1404, a report subwindow 1406, and the organizational chart area 200. The interface application 112 when executed may cause the one or more processors 114 to cause the graphical user interface 136 on the display 118 to display the report icons 1408 representing corresponding reports. In this example, five report icons 1408 are shown, but it will be understood that any number of report icons 1408 may be displayed, such as determined by the user and/or added via a create icon 1402. The create icon 1402 may be configured to be selectable, such as by a user moving the cursor 206 over the create icon 1402 and, upon being selected, to display an input screen, such as a report definition window 1900a (FIG. 19A) over the report window 1400 on the display 118. The report list icon 1404 may be configured to be selectable, such as by the user moving the cursor 206 over the report list icon 1404 and, upon being selected, to display a list of reports when available.

The interface application 112 may cause the one or more processors 114 to receive input from the user indicative of reports assigned to one or more of the positions 204, such as the positions 204 associated with the first position icon 602 and the second position icon 604. The assignment of the reports may be through drag-and-drop, pop-up box interface, text entry, and/or other input methods. The interface application 112 may then cause the one or more processors 114 to direct the directory server 102 to assign the position group 302 for the corresponding position 204 to the report group(s) 314a-n corresponding to the reports assigned through the user interface 136 to the position 204. Assigning the position group 302 to the report group(s) 314a-n may cause position-access permissions 308 assigned to the report group(s) 314a-n to be assigned to the position group 302. Nonexclusive examples of reports include accounting reports, human resource reports, and organizational performance metrics reports. Reports may include, for example, raw data, compiled data, graphics, charts, graphs, and/or images.

Figures 15A, 15B:
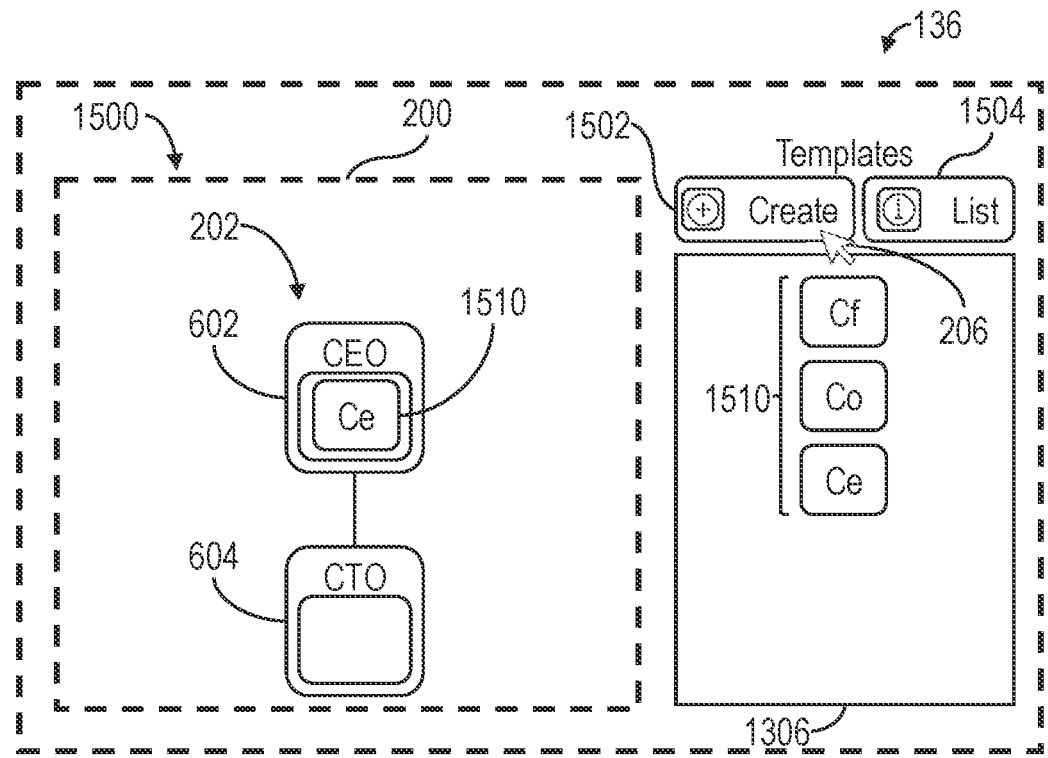
FIG. 15A is an exemplary screenshot of a template window of a graphical user interface on a display in accordance with the present disclosure.
FIG. 15B is an exemplary screenshot of a pop-up window on a template window of a graphical user interface on a display in accordance with the present disclosure.

As shown in FIG. 15A, in some implementations, creating or editing a position 204 may include assigning one or more templates to the position 204. The one or more templates may be indicative of predetermined combinations of group options 210. In this example, the graphical user interface 136 is shown including a template window 1500 which may include a create icon 1502, a list icon 1504, a template subwindow 1506, and/or the organizational chart area 200 with the organizational chart 202.

The create icon 1502 may be configured to be selectable, such as by a user moving the cursor 206 over the create icon 1502 and, upon being selected, to display a pop-up window 1512 over the template window 1500 on the display 118. The templates list icon 1504 may be similar in form and function to the positions list icon 504 and the employee list icon 704, except that, upon being selected, the templates list icon 1504 may be configured to display a list of one or more templates. The template subwindow 1506 may be configured to display one or more template icons 1510 corresponding to the one or more templates. The one or more templates and associated information regarding the one or more templates may be stored in the one or more databases 110, 110a of the user device 104 and/or the host server 119.

Referring now to FIG. 15B, in some implementations the pop-up window 1512 may include one or more of: text fields 1514a-n, radio buttons 1516a-n, a submit icon 1518, and a cancel icon 1520. The one or more text fields 1514a-n may be configured to receive one or more inputs from the user utilizing the input device 116, the one or more inputs indicative of various descriptors (e.g., name, description, category) for a template to be assigned to the position 204. The one or more radio buttons 1516a-n may be configured to receive one or more binary inputs from the user utilizing the input device 116, the one or more binary inputs indicative of one or more predetermined reports, one or more network resources, and/or one or more software applications for which the template is to be assigned position-access permissions 308. The submit icon 1518 may be configured to be selectable, such as by a user moving the cursor 206 over the submit icon 1518 and, upon being selected, the interface application 112 may cause the one or more processors 114 to transmit via the network 106 a signal indicative of a query directing the directory server 102 to create a template group 316a-n for the template.

Figure 16A:
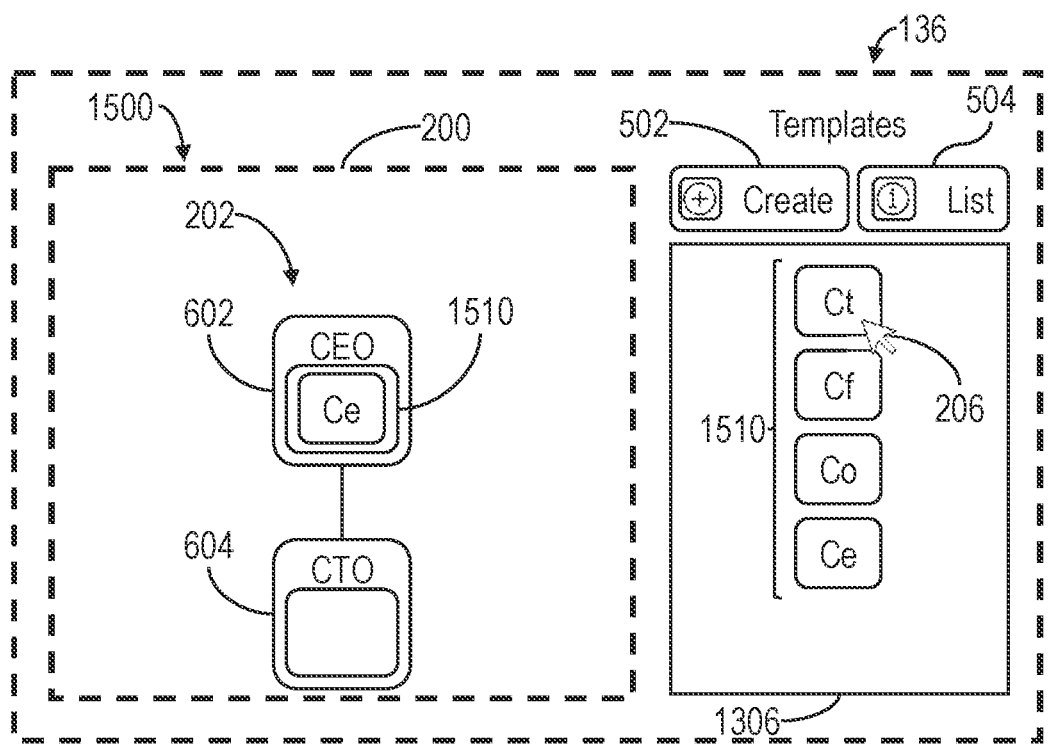
FIG. 16A is another exemplary screenshot of a template window of a graphical user interface on a display in accordance with the present disclosure.
Figure 16B:
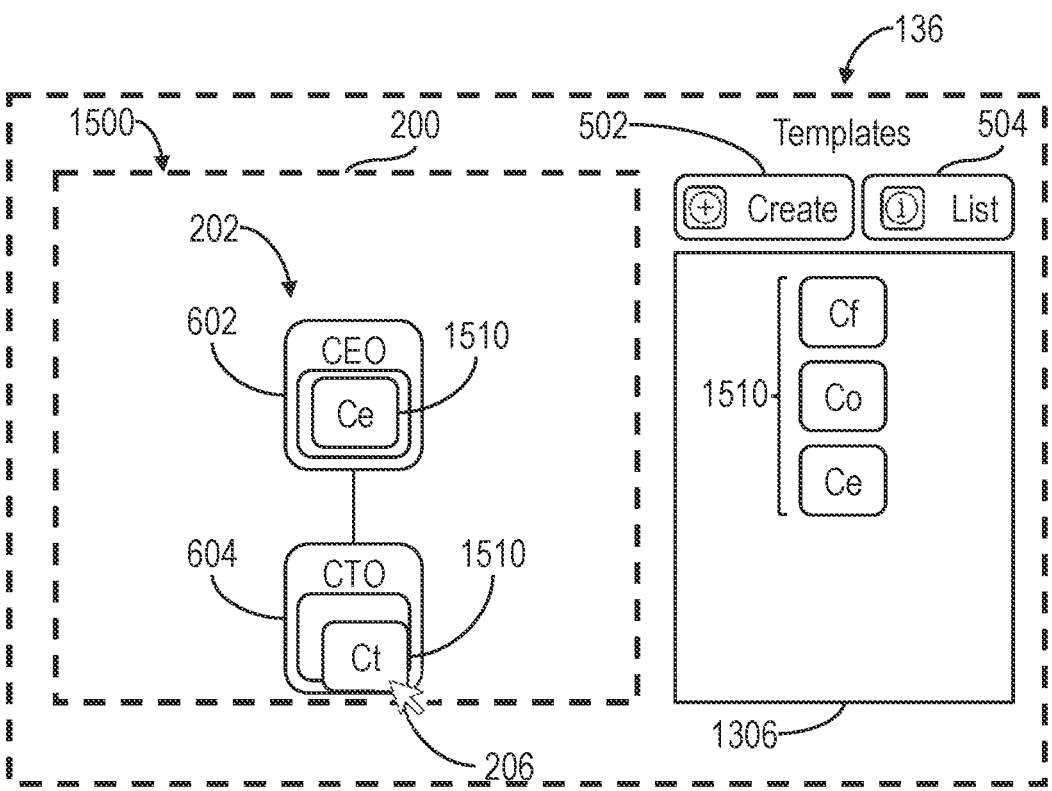
FIG. 16B is another exemplary screenshot of a template window of a graphical user interface on a display in accordance with the present disclosure.

In some implementations, as illustrated in FIGS. 16A and 16B, the template subwindow 1506 may display one or more template icons 1510 corresponding to one or more templates. The one or more template icons 1510 may be configured to be selectable, such as by a user moving the cursor 206 over the one or more template icons 1510 and, upon being selected, to be movable by the user moving the cursor 206 and placeable in the organizational chart area 200 on a position icon 602 indicative of the position 204. Upon a template icon 1510 of the one or more template icons 1510 being placed in the organizational chart area 200 on the position icon 602, the interface application 112 may cause the one or more processors 114 to transmit (such as via the network 106) a signal indicative of a query directing the directory server 102 to assign the position group 302 associated with the position icon 602 to the template group 316a-n associated with the template icon 1510. Assigning the position group 302 to the template group 316a-n may cause position-access permissions 308 assigned to the template group 316a-n to be assigned to the position group 302.

Figure 17A:
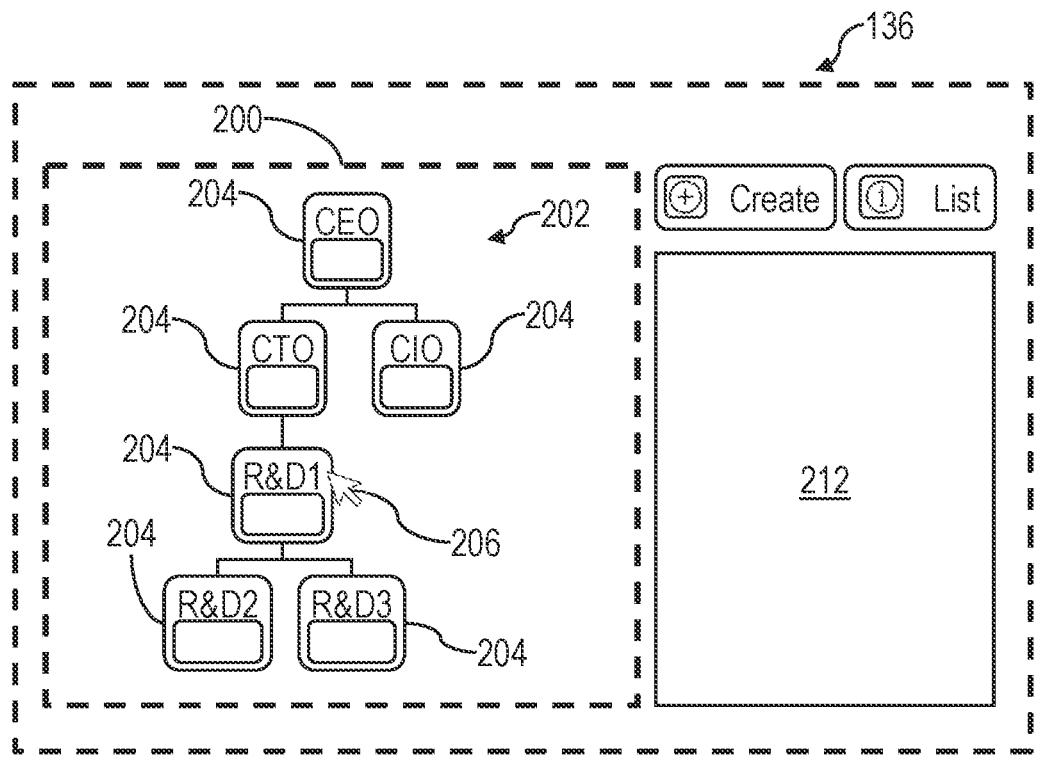
FIG. 17A is an exemplary screenshot of an organizational chart of a graphical user interface on a display in accordance with the present disclosure.
Figure 17B:
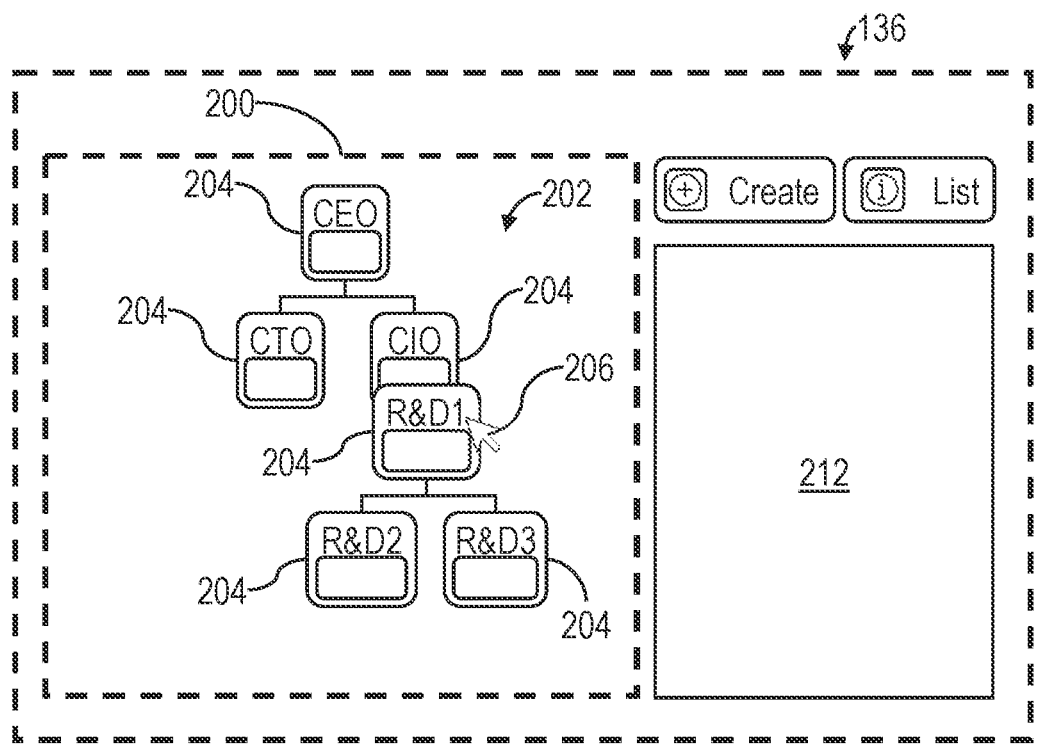
FIG. 17B is another exemplary screenshot of an organizational chart of a graphical user interface on a display in accordance with the present disclosure.

Turning now to FIGS. 17A and 17B, in some implementations, the interface application 112 stored by the one or more first non-transitory computer readable media 108 when executed may cause the one or more processors 114 to: receive input from a user through the user interface 136, the input indicative of one or more positions 204 being moved within the organizational chart 202; and direct the directory server 102 to re-assign position-access permissions 308 for the moved positions 204. In some implementations, the moved position 204 may inherit the group options 210 from the supervisory position 204 to which it is re-assigned. The group options 210 for the moved position 204 may be changed.

In some implementations, two or more of the positions 204 may be moved within the organizational chart 202 simultaneously. For example, as illustrated in FIGS. 17A and 17B, a user may move a sub-set of the organizational chart 202, the subset containing two or more position icons 602 associated with two or more positions 204. The interface application 112 may cause the one or more processors 114 to direct the directory server 102 to re-assign position-access permissions 308 for the two or more moved positions 204 based on the new relationship within the organizational chart 202. For example, the group options 210 for the two or more moved positions 204 may be automatically changed to match the group options 210 designated for the new supervisory position 204 and/or may be manually edited to maintain or change the group options 210. The interface application 112 may cause the one or more processor 114 to direct the directory server 102 to nest the corresponding position groups 302 of the two or more positions 204 in the permission groups 304a-n corresponding to the group options 210.

In some implementations, the interface application 112 stored by the one or more first non-transitory computer readable media 108 when executed may cause the one or more processors 114 to: receive a third input from the user interface 136, the third input indicative of an access request by the person associated with the position group 302 to access one or more of particular software applications and predetermined reports; and direct the directory server 102 to determine, based upon the two or more permission groups 304a-n within which the position group 302 is a member, whether the position-access permissions 308 assigned to the position group 302 include position-access permissions 308 to access the one or more of particular software applications and predetermined reports.

Additionally, the interface application 112 may cause the one or more processor 114 to carry out one or more of the following: receiving an organizational input via the user interface 136; constructing one or more commands interpretable by the directory service application 126 based on the organizational input; and transmitting the one or more commands to the directory server 102 (such as via the network 106 or directly).

In some implementations, the interface application 112 may cause the one or more processors 114, 114a of the user device 104 and/or the host server 119 to receive communication from the directory server 102 if the directory service domain 300 is modified by a source external to the interface application 112. In some implementations, the interface application 112 may cause the one or more processors 114, 114a to identify discrepancies between information stored in the one or more databases 110, 110a of the user device 104 and/or the host server 119 and information stored in the one or more databases 124 of the directory server 102. For example, the user interface 136 may include an errors page displaying such discrepancies.

The organizational input may be indicative of a desired modification to the directory service domain 300, including, for example, adding a username 306 as a member within a position group 302, where the position group 302 is assigned to two or more permission groups 304a-n, each of the two or more permission groups 304a-n having one or more position-access permissions 308. The command may, for example, direct the directory server 102 to assign the username 306 to the position group 302. In response to receiving the command via the network 106, the directory service application 126 may be configured to cause the one or more processors 128 to assign the position-access permissions 308 within the two or more permission groups 304a-n to the username 306 based on its membership within the position group 302. The interface application 112 may cause the one or more processors 114 to synchronize with the directory server 102, and/or cause the user interface 136 to reflect that the position-access permissions 308 assigned to the position group 302 have been assigned to the username 306. The interface application 112 may allow the user to communicate with the directory server 102 via the network 106 to manage position-access permissions 308 within the directory service domain 300 based on positions 204 within the organizational structure of an organization, rather than on usernames 306.

It will be understood by persons having ordinary skill in the art that, while the organizational chart 202 is shown as having one to four levels, the organizational chart 202 may have any number of levels as necessary to accommodate the organizational structure of the organization.

Figure 18:
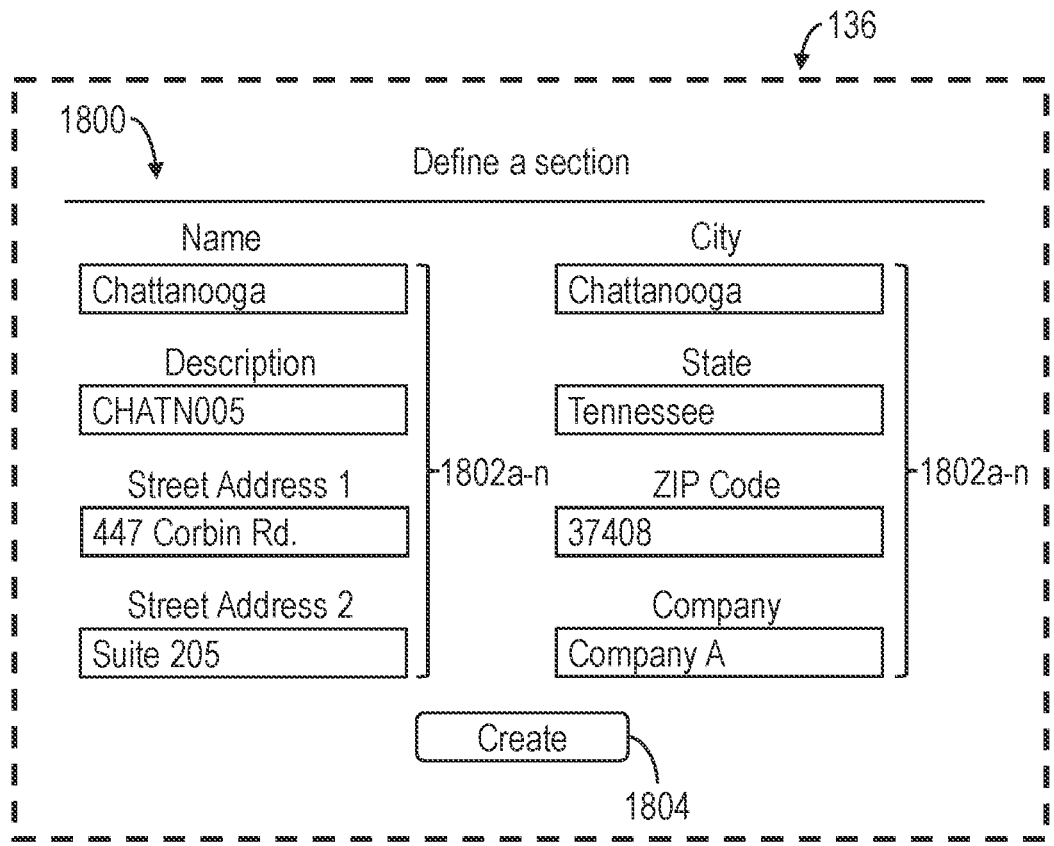
FIG. 18 is an exemplary screenshot of a section creation window of a graphical user interface on a display in accordance with the present disclosure.

As illustrated in FIG. 18, in some implementations, the user interface 136 may include a section window 1800. The section window 1800 may be used to define the group option 210 for the structural subgroups (such as Companies, Divisions, Areas, Locations, Departments, and so on) which may cause the interface application 112 to cause the one or more processors 114 to direct the directory service application 126 to define the corresponding section group 310a-n. The section window 1800 may include one or more text fields 1802a-n and/or a create icon 1804. The one or more text fields 1802a-n may be configured to receive one or more descriptors (which may include, but are not limited to, a name, a description, a company, a street address, a city, a state, and/or a ZIP code) of one or more of the structural subgroups of the organization in the real world (which may include, but are not limited to, a company, a department, a division, an area, and/or a location).

The create icon 1804 may be configured to be selectable, such as by a user moving the cursor 206 over the create icon 1804 and, upon being selected, the interface application 112 may cause the one or more processors 114 to transmit (such as via the network 106) a signal indicative of a query directing the directory server 102 to create a section group 310a-n for the new section and store the section group 310a-n in the one or more databases 124 of the directory server 102. Of course, it will be understood that the creation and/or definition of the group options 210 for the structural subgroups may be accomplished in other ways, including but not limited to, text fields, selection options, and radio buttons.

Each of the section groups 310a-n may be utilized by the directory service application 126 to cause the one or more processors 128 to restrict portions of the one or more reports, the one or more network resources, and/or the one or more software applications that are accessible by the position group 302. For example, a position 204 may be in a first Division of the structural subgroups of the organization and be assigned the corresponding group option 210, which is then associated with a first section group 310a of the section groups 310a-n. A particular username 306 may be associated with the position 204 which may be associated with the position group 302, while the position group 302 may be a member of the first section group 310a. A particular report and/or software application may include first contents which are relevant to the position 204, such as sales data for the first Division, as well as second contents which are not relevant to the position 204, such as sales data for a second Division of the structural subgroups associated with a second one of the section groups 310a-n. The directory service application 126 may cause the one or more processors 128 to allow the employee with the username 306 associated with the position 204 to access to the first contents based on the membership of the position group 302 in the first section group 310a, while also restricting the employee with the username 306 associated with the position 204 from accessing the second contents based on the exclusion of the position group 302 from the second one of the section groups 310a-n.

Figure 19A:
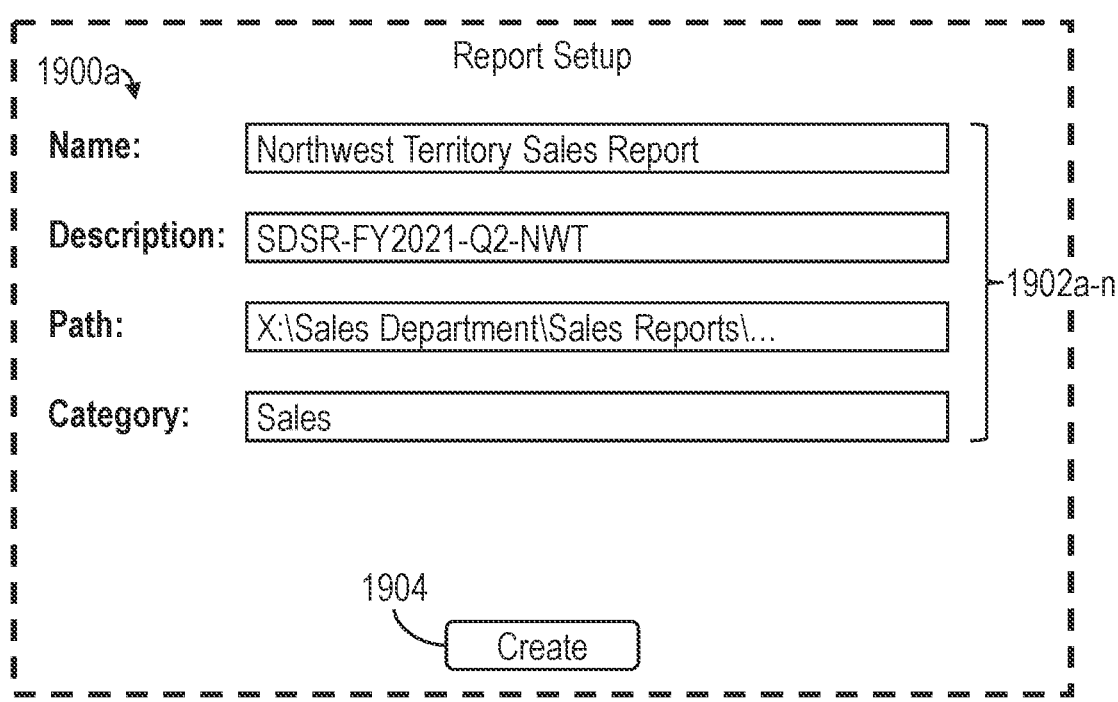
FIG. 19A is an exemplary screenshot of a report definition window of a graphical user interface on a display in accordance with the present disclosure.

As illustrated in FIG. 19A, in some implementations, the user interface 136 may include a report definition window 1900a. The report definition window 1900a may be used to define a report. The report definition window 1900a may include one or more text fields 1902a-n and/or a create icon 1904. The one or more text fields 1902a-n may be configured to receive one or more descriptors (which may include, but are not limited to, a name, a description, a category, and/or a path) of a report. The create icon 1904 may be configured to be selectable, such as by a user moving the cursor 206 over the create icon 1904 and, upon being selected, the interface application 112 may cause the one or more processors 114 to transmit (such as via the network 106) a signal indicative of a query directing the directory server 102 to create (or edit) the report group 314a-n for the new (or edited) report and/or store the report group 314a-n in the one or more databases 124 of the directory server 102.

Figure 19B:
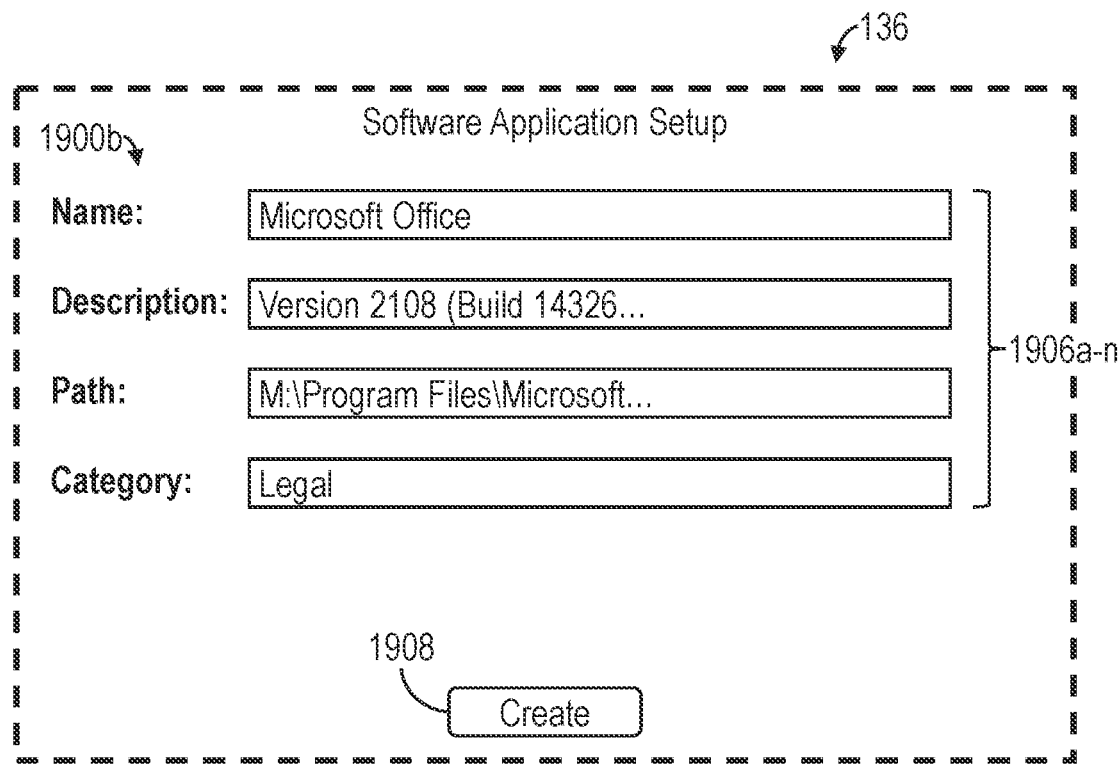
FIG. 19B is an exemplary screenshot of an application definition window of a graphical user interface on a display in accordance with the present disclosure.

As illustrated in FIG. 19B, in some implementations, the user interface 136 may include an application definition window 1900b. The application definition window 1900b may be used to define a software application. The application definition window 1900b may include one or more text fields 1906a-n and/or a create icon 1908. The one or more text fields 1906a-n may be configured to receive one or more descriptors (which may include, but are not limited to, a name, a description, a category, and/or a path) of a software application. The create icon 1908 may be configured to be selectable, such as by a user moving the cursor 206 over the create icon 1908 and, upon being selected, the interface application 112 may cause the one or more processors 114 to transmit (such as via the network 106) a signal indicative of a query directing the directory server 102 to create (or edit) an application group 312a-n for the new (or edited) software application and/or store the application group 312a-n in the one or more databases 124 of the directory server 102.

Figure 20:
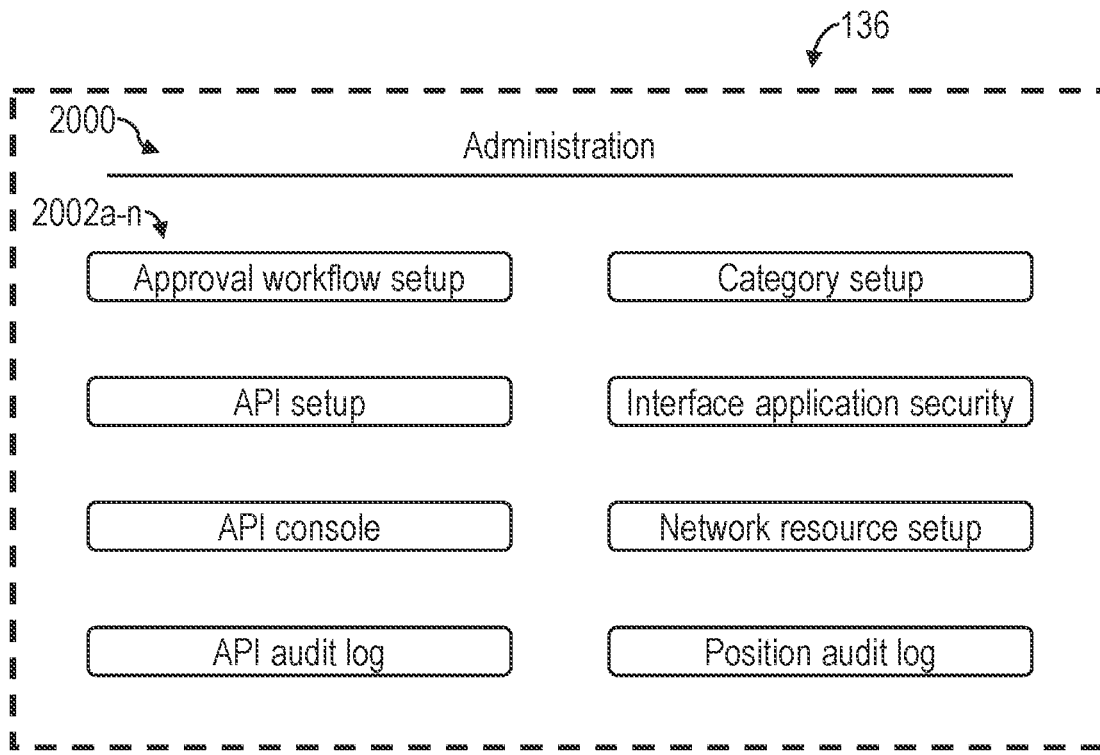
FIG. 20 is an exemplary screenshot of an administration window of a graphical user interface on a display in accordance with the present disclosure.

As illustrated in FIG. 20, in some implementations, the user interface 136 may include an administration window 2000. The administration window 2000 may include one or more administration icons 2002a-n, which may include, for example, an approval workflow setup icon, a category setup icon, an API setup icon, an interface application security icon, an API console icon, a network resource setup icon, an API audit log icon, and a position audit log icon. Each of the one or more administration icons 2002a-n may be configured to be selectable, such as by a user moving the cursor 206 over the icon 2002a-n, and, upon being selected, to display one of the windows on the display 118 as described herein (see, for example, FIGS. 22-30). For example, selecting the approval workflow setup icon may cause the approval workflow setup window 2400 (FIG. 24) to be displayed, selecting the category setup icon may cause the category setup window 2600 (FIG. 26) to be displayed, selecting the API setup icon may cause the API setup window 2900 (FIG. 29) to be displayed, selecting the interface application security icon may cause the interface application security window 2500 (FIG. 25) to be displayed, selecting the API console icon may cause the API console window 3000 (FIG. 30) to be displayed, selecting the network resource setup icon may cause the network resource setup window 2700 (FIG. 27) to be displayed, selecting the API audit log icon may cause the API audit log window 2300 (FIG. 23) to be displayed, and selecting the position audit log icon may cause the position audit log window 2200 (FIG. 22) to be displayed. Additional or alternative selectable icons and windows may be displayed. Though icons and windows are described in this and other examples herein, in will be understood that other user interfaces may be used.

In some implementations, the integration between the interface application 112 and the directory service application 126 is bi-directional, meaning that any modifications to the directory service domain 300 made by a user in the interface application 112 may be applied automatically in the directory service application 126, and vice-versa.

In one embodiment, the interface application 112 when executed may cause the one or more processors 114 to print a graphical representation of the organizational chart 202. In some implementations, access to and/or printing of the organizational chart 202 may be controlled by position-access permissions 308. For example, particular positions may be assigned position-access permissions 308 such that particular positions have access to, and/or the ability to print, parts of the organizational chart 202 while being blocked from access to and/or printing other parts of the organizational chart 202.

In some implementations, printing the graphical representation of the organizational chart 202 may include copying the organizational chart 202 to a file, which may be saved in a portable document format (e.g., PDF) or printed on, for example, one or more pieces of paper utilizing a printer. The one or more databases 110, 110a of the user device 104 and/or the host server 119 may store the organizational chart 202.

In one embodiment, the interface application 112 of the one or more user devices 104 and/or the host server 119, when executed, may cause the one or more processors 114 to receive a first input from the user interface 136, the first input indicative of a new position 204 within an organizational structure of an organization. The interface application 112 may cause the one or more processors 114 to direct the directory server 102 to create a corresponding position group 302 for the new position 204 within the directory server 102, the directory server 102 storing position-access permissions 308 assigned to a plurality of permission groups 304a-n, the plurality of permission groups 304a-n containing no usernames 306; direct the directory server 102 to nest the position group 302 within two or more permission groups 304a-n of the plurality of permission groups 304a-n by assigning the position group 302 as a member within each of the two or more permission groups 304a-n; receive a second input from the user interface 136, the second input indicative of a username 306 associated with the new position 204, the username 306 identifying a person assigned to the new position 204 within the organization; and direct the directory server 102 to assign the username 306 to the position group 302, thereby associating the position group 302 with the person identified by the username 306, the position group 302 associated with no more than one person at any one time, and thereby assigning the position-access permissions 308 assigned to the two or more permission groups 304a-n to the person associated with the position group 302.

Figure 21:
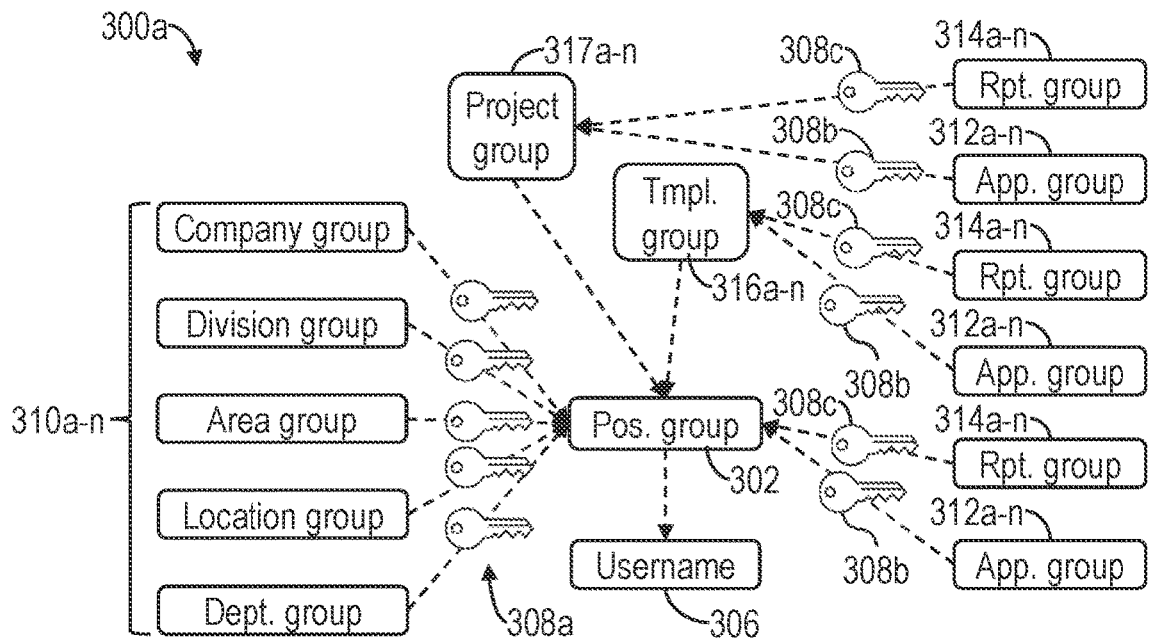
FIG. 21 is a data flow diagram of cascading position-access permissions in an exemplary embodiment of a directory service domain constructed in accordance with the present disclosure.

Referring now to FIG. 21, shown therein is a data flow diagram of cascading position-access permissions 308 in an exemplary embodiment of another directory service domain 300a constructed in accordance with the present disclosure. As in the previous directory service domain 300, the position group 302 does not include any position-access permissions 308a-n. Rather, the position group 302 may inherit one or more position-access permissions 308a-n from one or more permission groups 304*a-n*, which may include: position-access permissions 308*a* for accessing one or more network resources 121, which may be inherited from one or more section groups 310*a-n*; position-access permissions 308*b* for accessing one or more applications, which may be inherited from one or more application groups 312*a-n*; position-access permissions 308*c* for accessing one or more reports, which may be inherited from one or more report groups 314*a-n*; and/or a combination of position-access permissions 308*b*, 308*c* for accessing one or more applications and/or one or more reports (i.e., position-access permissions 308*d*), which may be inherited from one or more template groups 316*a-n* and/or one or more project groups 317*a-n*.

Additionally, the directory service domain 300*a* may be configured such that one or more of the section groups 310*a-n* may act as a filter for position-access permissions for the one or more of the application groups 312*a-n* and/or the report groups 314*a-n*. The group options 210 and corresponding section groups 310*a-n* may act as a filter for position-access permissions for the position group 302 and thereby for the position 204, and the employee assigned to the position 204. For example, the position group 302 may be assigned to a first one of the section groups 310*a-n* that is associated with an Area Group and gain position-access permissions 308*a* that are determined by the area in the organization to which the position 204 belongs. The position-access permissions 308*a* for that Area Group may limit the position-access permissions 308*c* for the report group(s) 314*a-n* and/or the application group(s) 312*a-n* associated with assigned to the position group 302. The position-access permissions 308*a* for the section groups 310*a-n* may determine, for example, how much and/or what type of data is accessible in reports and/or software applications for the position 204. The position-access permissions 308 for the section groups 310*a-n* may determine, for example, the functions accessible to the position 204 in the software applications.

Position-access permissions 308*a* flow from section groups 310, application groups 312, report groups 314, template groups 316, and/or project groups 317 to the position group 302. There are no position-access permissions 308*a* assigned to a username 306. Rather, all position-access permissions 308*a* are assigned to the position 302. Then, a username 306 may be assigned to the position group 302, thereby gaining the position-access permissions 308*a* through the assignment to the position group 302.

Figure 22:
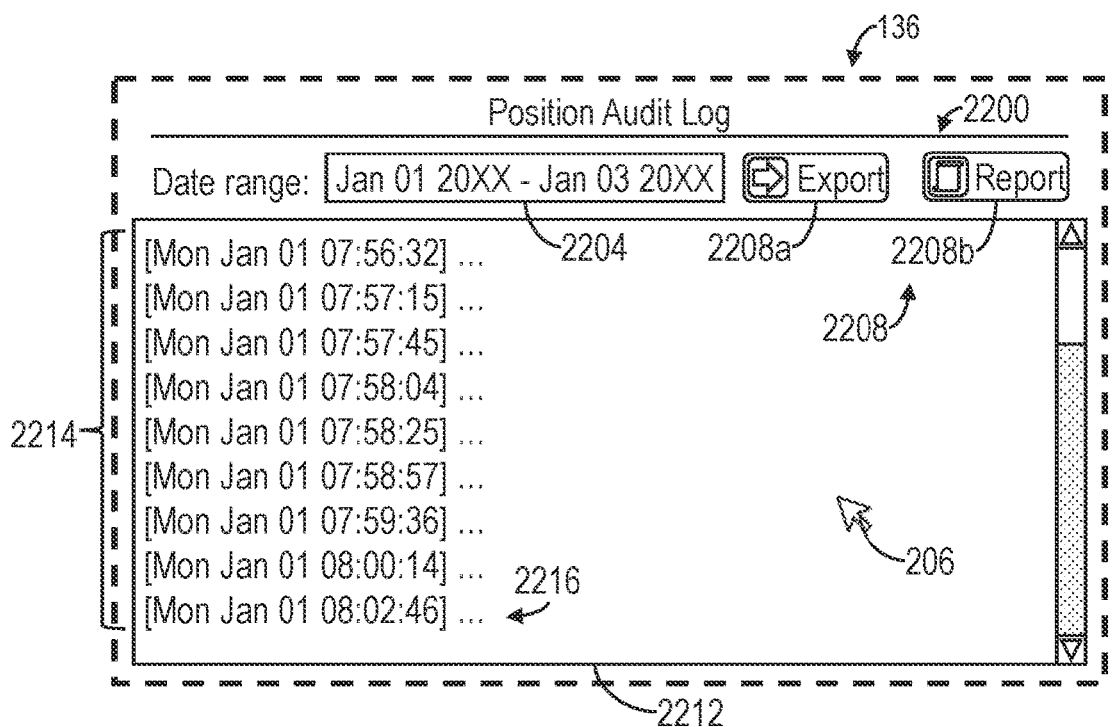
FIG. 22 is an exemplary screenshot of a position-based audit log viewing window of a graphical user interface on a display in accordance with the present disclosure.

As illustrated in FIG. 22, in some implementations, the user interface 136 may include a position audit log window 2200. The position audit log window 2200 may include a position audit "date range" text field 2204, one or more position audit "data transfer" icons 2208, and a position audit viewing subwindow 2212. In some embodiments, the one or more position audit "data transfer" icons 2208 includes, for example, a position audit export icon 2208*a* and a position audit report icon 2208*b*.

The interface application 112 may be configured to maintain a position audit log 2214 comprising one or more position audit log entries 2216. In some implementations, each of the position audit log entries 2216 may be representative of a single user/position interaction with the interface application 112, as described herein. The position audit log 2214 (and the position audit log entries 2216 contained therein) may be stored in one or more of: the one or more databases 110 of the user device 104, the one or more databases 110*a* of the host server 119, the one or more databases 124 of the directory server 102, and the one or more external databases 134. Each of the position audit log entries 2216 may comprise one or more of: the position 204 and/or the position group 302 of the user interacting with the interface application, the username 306 associated with the position 204 and/or the position group 302 at the time of the interaction; the real name of the user associated with the username 306 assigned to the position group 302 at the time of the interaction; the email address of the user associated with the username 306 assigned to the position group 302 at the time of the interaction; the date and/or time of the interaction between the position group 302 and the interface application 112; and details of the interaction, as described below.

In some embodiments, the interface application 112 may cause the one or more processors 114 to add a position audit log entry 2216 to the position audit log 2214 in response to a position accessing one or more of the databases 110, 110*a*, 124, 134 described herein. For example, a user may be required to enter a username 306 and a password associated with the position 204 to initiate an interaction through the interface application 112 or an interaction with the network resources, applications, and/or reports.

In response to the interaction, the interface application 112 may cause the one or more processors 114 to create a new position audit log entry 2216 and store the new position audit log entry 2216 in the position audit log 2214 in one or more of: the one or more databases 110 of the user device 104, the one or more databases 110*a* of the host server 119, the one or more databases 124 of the directory server 102, and the one or more external databases 134. The new position audit log entry 2216 may comprise, for example, one or more of (but not limited to): the position 204 and/or the position group 302 initiating the interaction, the username 306 associated with the position 204 and/or the position group 302 at the time of the interaction, the real name of the user associated with the username 306 associated with the position 204 and/or the position group 302 at the time of the interaction, the email address of the user associated with the username 306 associated with the position 204 and/or the position group 302 at the time of the interaction, the date and time of the interaction, and a record indicative of a success or failure of the interaction.

In some embodiments, the interface application 112 may cause the one or more processors 114 to add a position audit log entry 2216 to the position audit log 2214 in response to a user using the interface application 112 to create, delete, and/or modify one or more aspects of the directory service domain 300, which may include one or more employees, one or more network resource 121, one or more organizational charts 202, one or more position groups 302, one or more permission groups 304*a-n*, one or more usernames 306, one or more position-access permissions 308*a-n*, one or more section groups 310*a-n*, one or more software application groups 312*a-n*, one or more report groups 314*a-n*, one or more template groups 316*a-n*, and/or one or more project groups 317*a-n*.

Each of the one or more position audit "data transfer" icons 2208 may be configured to be selectable, such as by a user moving the cursor 206 over the icon 2208, and, upon being selected, the interface application 112 may cause the one or more processors 114 to transfer one or more entries of the position audit log 2214 to a new location, such as for example the first non-transitory computer readable media 108 of one of the one or more user devices 104. In some implementations, the position audit export icon 2208*a* may be configured to be selectable, such as by user moving the cursor 206 over the icon 2208*a*, and, upon being selected, the interface application 112 may cause the one or more processors 114 to copy the audit log 2214 to a file, which may be saved by the user in a readable format (e.g., a PDF, an Excel spreadsheet, a text document, etc.) or printed on, for example, one or more pieces of paper by the user utilizing a printer.

In some embodiments, the position audit report icon 2208b is configured to be selectable, such as by the user moving the cursor 206 over the icon 2208b, and, upon being selected, the interface application 112 may cause the one or more processors 114 to generate a report based on the position audit log 2214. This report may be copied to a file, which may be saved by the user in a readable format (e.g., a PDF, an Excel spreadsheet, a text document, etc.) or printed on, for example, one or more pieces of paper by the user utilizing a printer. In some embodiments, the report may be searchable by one or more key values (e.g., the date of the position audit log entry 2216, the user associated with the position audit log entry 2216 at the time of the interaction, the position 204 associated with the user at the time of the interaction, the action associated with the position audit log entry 2216, etc.).

Figures 23, 24:
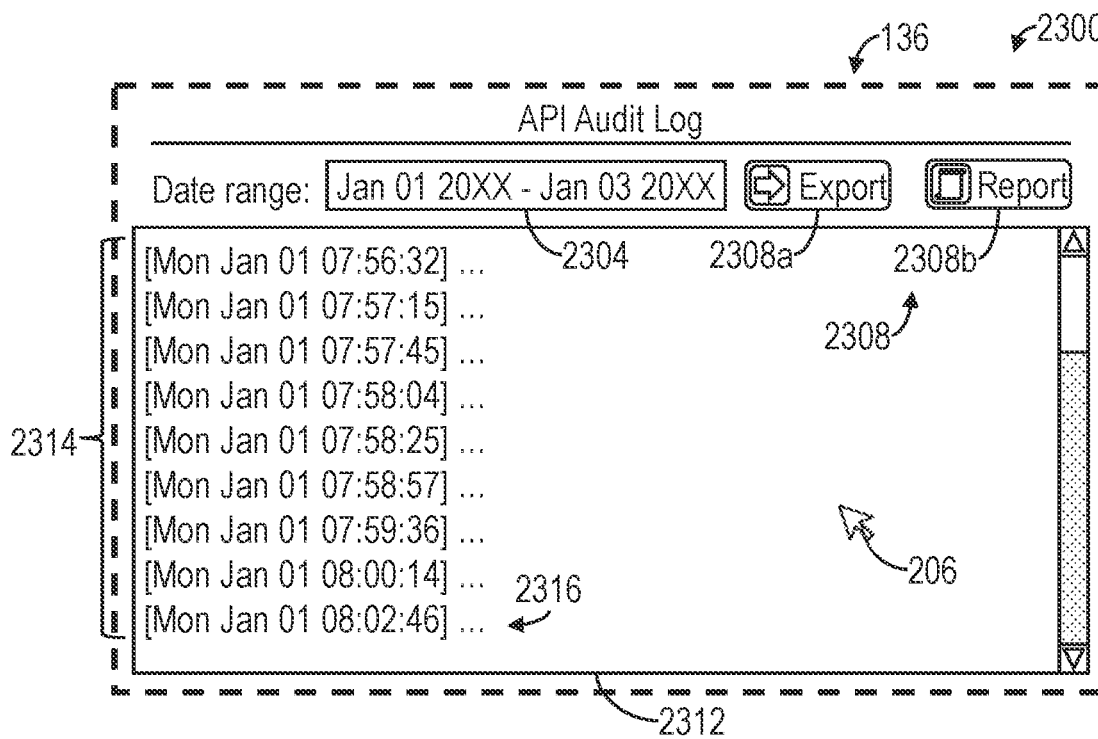
FIG. 23 is an exemplary screenshot of an application programming interface audit log viewing window of a graphical user interface on a display in accordance with the present disclosure.
FIG. 24 is an exemplary screenshot of an approval workflow setup window of a graphical user interface on a display in accordance with the present disclosure.

As illustrated in FIG. 23, in some implementations, the user interface 136 may include an application programming interface (API) audit log window 2300. In some implementations, the API audit log window 2300 may be accessible only by a system administrator (i.e., a user with administrator access to the interface application 112) or other designated user. The API audit log window 2300 may include an API "date range" text field 2304, one or more API "data transfer" icons 2308, and an API viewing subwindow 2312. In some implementations, the one or more API "data transfer" icons 2308 includes, for example, an API export icon 2308a and an API report icon 2308b. The interface application 112 may be configured to maintain an API log 2314 comprising one or more API log entries 2316.

The API audit log window 2300 may function similarly to the position audit log window 2200, except that the position audit log entries 2216 are representative of a single user/position interaction with the interface application 112, while the API log entries 2316 are representative of a single API interaction with the interface application 112 (i.e., one or more aspect of the interface application 112 being modified by one or more of the external software applications 132 and/or one or more of the external databases 134).

In some implementations, certain API log entries 2316 indicative of API mismatches and/or API errors (as will be described below) may be highlighted for a user. Each of such API log entries 2316 may comprise one or more of: the date and/or time of the API mismatch and/or API error; an identifier (e.g., a name and/or an identification number) of the external software application 132 and/or the external database 134 associated with the API log entry 2316; a description of the API mismatch and/or API error; a priority and/or severity level of the API mismatch and/or API error; and a completion indicator for the API mismatch and/or API error indicative of a resolution status of the API mismatch and/or API error.

The API log entries 2316 may include API mismatches between data stored by the interface application 112 and data received from the one or more external software applications 132 and/or the one or more external databases 134. If it is determined that there is an API mismatch, the interface application 112 may be provided with one or more rules for determining how to resolve the API mismatch. For example, a first rule may be to prioritize data that is most recent, and a second rule may be to prioritize data received from a particular one of the one or more external software applications 132 and the one or more external databases 134. The interface application 112 may give priority to one of the one or more rules; in the previous example, the interface application 112 may give priority to the second rule such that the data received from the particular one of the one or more external software applications 132 and the one or more external databases 134 is prioritized even if the data is less recent than the data stored by the interface application 112. It will be understood by persons having ordinary skill in the art that the interface application 112 may be provided with any manner of rules for determining the priority of data and resolving an API mismatch.

In some embodiments, the API log entries 2316 include API errors encountered by the interface application 112 while attempting to communicate data with the one or more external software applications 132 and/or the one or more external databases 134. The interface application 112 may assign a severity level to each API error to assist the user in determining which API error to address first. That is, an API error with a higher severity level may have a greater impact on the normal functioning of the interface application 112, while an API error with a lower severity level may have a lesser impact on the normal functioning of the interface application 112.

Referring now to FIG. 24, shown therein is an exemplary screenshot of an approval workflow setup window 2400 of a graphical user interface 136 on a display 118 in accordance with the present disclosure. As shown in FIG. 24, in some implementations, the user interface 136 may include an approval workflow setup window 2400 for creating and/or editing approval workflows. The approval workflow setup window 2400 may include one or more approval workflow text fields 2404a-n, an approval workflow submit icon 2408, and an approval workflow cancel icon 2412. The one or more approval workflow text fields 2404a-n may be configured to receive, for example, an access group to which an approval workflow is attached, a position of an approving-employee that is able to accept or deny the approval workflow, a requesting-user that is requesting a modification to the access group, and/or a requested modification to the access group. In some implementations, the approval workflow submit icon 2408 may be configured to be selectable, such as by a user moving the cursor 206 over the submit icon 2408, and, upon being selected, the interface application 112 may cause the one or more processors 114 to create an approval workflow with the parameters received by the one or more approval workflow text fields 2404a-n and store the approval workflow in the one or more databases 124 of the directory server 102. The approval workflow cancel icon 2412 may be configured to be selectable, such as by a user moving the cursor 206 over the approval workflow cancel icon 2412, and, upon being selected, to close the approval workflow setup window 2400 and display the administration window 2000 on the display 118.

In some implementations, a system administrator (i.e., a user assigned to a position with administrator access to the interface application 112) may determine that one or more of the access groups (for example, the position groups 302a-n, the permission groups 304a-n, the section groups 310a-n, the software application groups 312a-n, the report groups 314a-n, the template group 316a-n, and/or the project groups 317a-n) should be given stronger protection from, for example, being modified. In such a case, the system administrator may determine that an approval workflow will be required to modify an aspect of the access group.

In doing so, the system administrator may specify a position group 302 that will be given approval privileges for the access group; that is, an approving-employee (for example, a manager) associated with the specified position group 302 will be able to accept or deny an approval workflow to approve or deny the modification.

For example, for a user to request to modify the access group, the requesting user may be required to create an approval workflow specifying the requested modification they wish to make (e.g., adding/removing position-access permissions 308*a-n*, adding/removing employees, modifying nested access groups, etc.). In some implementations, the requested modification and the approval workflow may be limited to a specific area of the workflow and/or a specific organizational area. Upon the approval workflow being created, the approval workflow may be viewable by the approving-employee associated with the position group 302 that was given the approval privileges. At that point, the approving-employee may determine whether to accept or deny the approval workflow. If the approving-employee associated with the position group 302 that was given the approval privileges denies the approval workflow, the interface application 112 may present a notification (e.g., an alert) to the requesting user that the approval workflow was denied. If the approving-employee associated with the position group 302 that was given the approval privileges accepts the approval workflow, the interface application 112 may present a notification (e.g., an alert) to the requesting user that the approval workflow was accepted, and/or the interface application 112 may perform the requested modification automatically and present a notification (e.g., an alert) to the requesting user that the requested modification was completed. For example, the notification may be sent to the requesting user in the form of a message (e.g., an email message, a text message, a message within an intra-company communication system, etc.).

In an illustrative example, an interface-application system administrator determines that a section group 310 for a particular department should require approval from a department lead (i.e., a lead for the particular department) before the section group 310 may be modified by a user. The system administrator creates an approval workflow specifying that the access group is the section group 310 and the approving-employee is a position group 302 associated with the department lead. A requesting user within the department creates an approval workflow specifying that they themselves are the requesting user and the requested modification is the addition of a position-access permission 308 to their position group 302. The approval workflow is then viewable by the approving-employee (for example, a department lead), who determines to accept the approval workflow, thereby granting the position-access permission 308 to the employee. The requesting employee receives an indication (e.g., an alert) from the interface application 112 indicating that the approval workflow was accepted and the requested modification was completed.

Figures 25, 26:
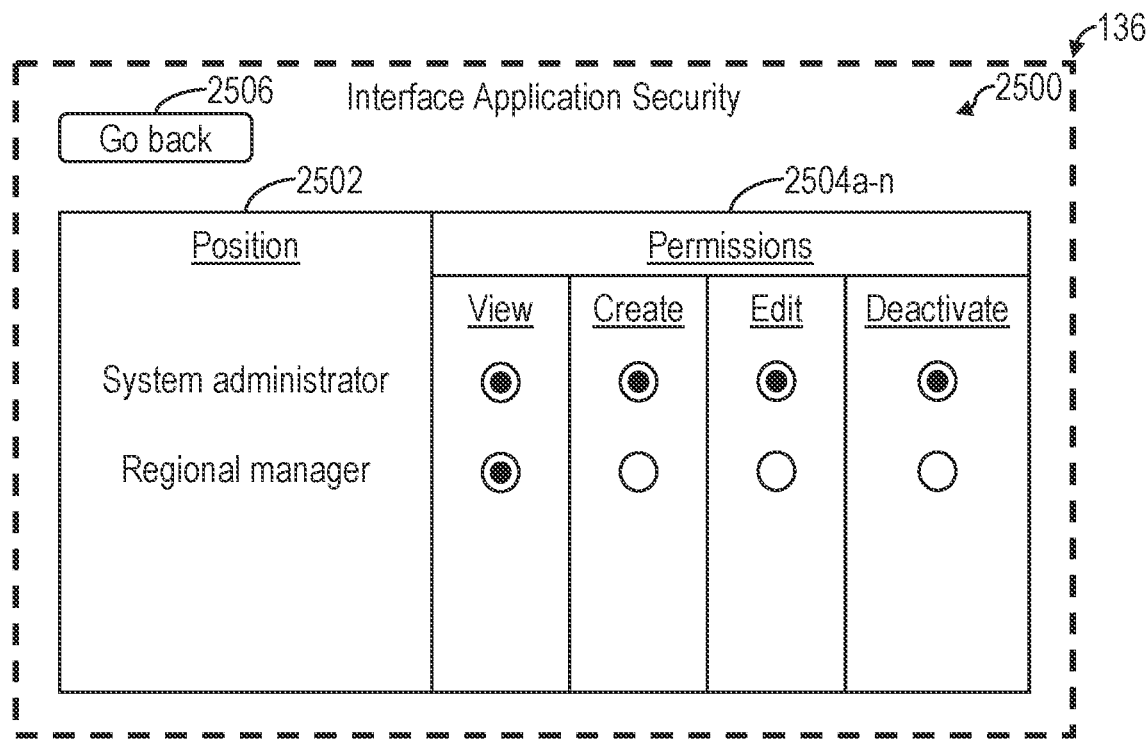
FIG. 25 is an exemplary screenshot of an interface application security window of a graphical user interface on a display in accordance with the present disclosure.
FIG. 26 is an exemplary screenshot of a category setup window of a graphical user interface on a display in accordance with the present disclosure.

As illustrated in FIG. 25, in some implementations, the user interface 136 may include an interface application security window 2500 for approving and/or denying one or more interface application permissions for the positions 204 described herein. The interface application security window 2500 may comprise a position list 2502 and one or more permissions radio buttons 2504*a-n*. The position list 2502 may list each of the positions 204 that have been defined. For each of the positions 204 listed in the position list 2502, one or more permissions radio buttons 2504*a-n* may be used for defining one or more interface applications permissions for the position 204, the one or more permissions radio buttons 2504*a-n* configured to receive one or more binary inputs from the user utilizing the input device 116.

In some implementations, as shown in FIG. 25, the one or more permissions radio buttons 2504*a-n* may be indicative of a permission to view one or more aspect of the interface application 112, a permission to create new groups using the interface application 112, a permission to edit groups using the interface application 112, and/or a permission to deactivate groups using the interface application 112.

In some implementations, the interface application security window 2500 may further comprise an interface application security back icon 2506 configured to be selectable, such as by the user moving the cursor 206 over the interface application security back icon 2506, and, upon being selected, to close the interface application security window 2500 and display the administration window 2000 on the display 118.

As illustrated in FIG. 26, in some implementations, the user interface 136 may include a category setup window 2600 for defining and/or editing a category. The category setup window 2600 may comprise one or more category text fields 2602*a-n* and a category submit icon 2604. The one or more category text fields 2602*a-n* may be configured to receive one or more descriptors (which may include, but are not limited to, a name, a description, a section, etc.) of a category. The category submit icon 2604 may be configured to be selectable, such as by a user moving the cursor 206 over the category submit icon 2604 and, upon being selected, the interface application 112 may create a new category with the descriptors as received by the one or more category text fields 2602*a-n*.

In some implementations, the category setup window 2600 may further comprise a category cancel icon 2606 configured to be selectable, such as by a user moving the cursor 206 over the category cancel icon 2606, and, upon being selected, to close the category setup window 2600 and display the administration window 2000 on the display 118.

As illustrated in FIG. 27, in some implementations, the user interface 136 may include a network resource setup window 2700 for defining and/or editing a network resource 121. The network resource setup window 2700 may comprise one or more network resource text fields 2702*a-n* and a network resource submit icon 2704. The one or more network resource text fields 2702*a-n* may be configured to receive one or more descriptors (which may include, but are not limited to, a name, a description, an address such as for example an Internet Protocol address, and/or a category) of a network resource 121. The network resource submit icon 2704 may be configured to be selectable, such as by a user moving the cursor 206 over the network resource submit icon 2704, and, upon being selected, the interface application 112 may create a new network resource 121 with the descriptors as received by the one or more network resource text fields 2702*a-n*.

In some implementations, the network resource setup window 2700 may further comprise a network resource cancel icon 2706 configured to be selectable, such as by a user moving the cursor 206 over the network resource cancel icon 2706, and, upon being selected, to close the network resource setup window 2700 and display the administration window 2000 on the display 118.

As illustrated in FIG. 28, in some implementations, the user interface 136 may include a project setup window 2800 for defining and/or editing a project 317*a-n*. A project 317 may be indicative of a predetermined combination of group options 210, similar to a template 316. However, the group options 210 may be associated with position-access permissions 308 that are to be assigned to a position 204 only during a period in which the position 204 is assigned to the project 317 (i.e., position-access permissions 308 that will be removed from the position 204 once the position 204 is no longer assigned to the project 317). The project setup window 2800 may comprise one or more project text fields 2802a-n, one or more project radio buttons 2804a-n, and a project submit icon 2806.

The one or more project text fields 2802a-n may be configured to receive one or more descriptors (which may include, but are not limited to, a name, a description, and/or a category) of a project 217. The one or more project radio buttons 2804a-n may be used for defining one or more position-access permissions 308 for the project 317, the one or more project radio buttons 2804a-n configured to receive one or more binary inputs from the user utilizing the input device 116. In some implementations, as shown in FIG. 28, the one or more project radio buttons 2804a-n may be indicative of one or more software applications, one or more network resources, and/or one or more predetermined reports to associate with the project 317, for example. The project submit icon 2806 may be configured to be selectable, such as by a user moving the cursor 206 over the project submit icon 2806, and, upon being selected, the interface application 112 may create a new project 317 with the descriptors and the position-access permissions 308 as received by the one or more project text fields 2802a-n and/or the one or more project radio buttons 2804a-n, respectively.

In some implementations, the project setup window 2800 may further comprise a cancel icon 2808 configured to be selectable, such as by a user moving the cursor 206 over the cancel icon 2808, and, upon being selected, to close the project setup window 2800 and display the administration window 2000 on the display 118.

Figure 29:
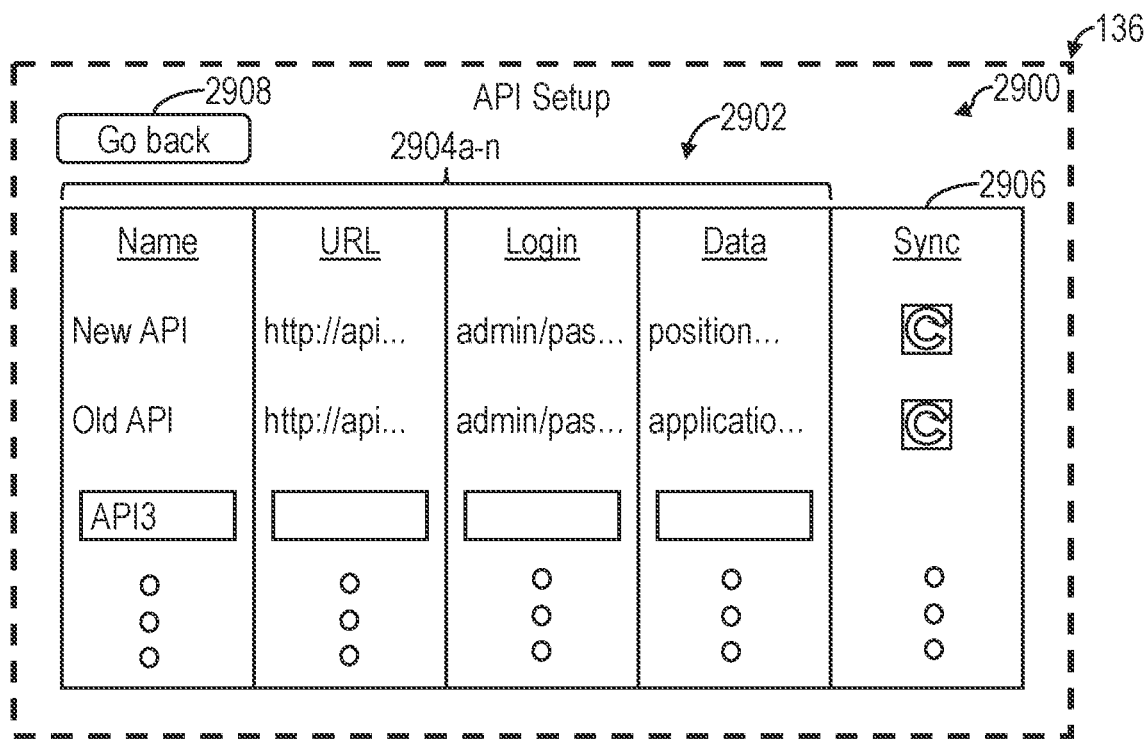
FIG. 29 is an exemplary screenshot of an application programming interface setup window of a graphical user interface on a display in accordance with the present disclosure.

As illustrated in FIG. 29, in some implementations, the user interface 136 may include an API setup window 2900 for defining and/or editing communication with the one or more external software applications 132 and the one or more external databases 134. The API setup window 2900 may comprise an API list 2902 and one or more API setup text fields 2904a-n. The API list 2902 may list each of the one or more external software applications 132 and the one or more external databases 134 that have been defined.

The one or more API setup text fields 2904a-n may be configured to receive one or more descriptors (which may include, but are not limited to, a name, an address such as a Uniform Resource Locator, a login such as a username and a password, and data to be imported from the external software application 132 or the external database 134) for the external software application 132 or the external database 134.

For each particular one of the one or more external software applications 132 and the one or more external databases 134 listed in the API list 2902, an API sync button 2906 may be configured to be selectable, such as by the user moving the cursor 206 over the API sync button 2906, and, upon being selected, the interface application 112 may cause the one or more processors 114 to synchronize the one or more databases 110 of the one or more user devices 104, the one or more databases 110a of the host server 119, and/or the one or more databases 124 of the directory server 102 with the particular one of the one or more external software applications 132 and the one or more external databases 134. Of course, it will be understood that the interface application 112 may cause the one or more processors 114 to synchronize based on other factors, such as predetermined times, time frames, and/or external input detection.

In some implementations, the interface application 112, when executed, may cause the one or more processors 114 to synchronize with the one or more external software applications 132, the one or more external databases 134, the one or more databases 110 of the one or more user devices 104, the one or more databases 110a of the host server 119, and/or the one or more databases 124 of the directory server 102 at a predetermined time. In some implementations, the interface application 112, when executed, may cause the one or more processors 114 to synchronize with the one or more external software applications 132, the one or more external databases 134, the one or more databases 110 of the one or more user devices 104, the one or more databases 110a of the host server 119, and/or the one or more databases 124 of the directory server 102 at regular intervals (non-exclusive examples of which include hourly, daily, weekly, monthly, quarterly, and/or yearly).

In one embodiment, the interface application 112, when executed, may cause the one or more processors 114 to synchronize with the one or more external software applications 132 and/or the one or more external databases 134 through external application programming interfaces (API) and/or direct queries (for example, using SQL and/or LDAP). The one or more external software applications 132 and/or the one or more external databases 134 may communicate with the host server 119 and/or the one or more user devices 104 via the network 106.

In some implementations, the one or more external software applications 132 may be one or more of, but not limited to: human resources software systems, customer relationship management software systems, enterprise resource planning software systems, payroll systems, and office productivity software systems. The one or more external software applications 132 may be part of or external to software applications of the organization. For example, when the one or more external software applications 132 is a payroll system, the payroll system may be internal to the organization or external (such as a third-party vendor) to the organization.

The one or more external databases 134 may, for example, store information regarding employees of one or more real-world organizations. In some implementations, the one or more external databases 134 may store data associated with the one or more external software applications 132. In some implementations, the one or more external databases 134 may store hierarchy data regarding the positions 204. In some implementations, the one or more external databases 134 may store information associated with the group options 210.

In one implementation, the interface application 112 when executed may cause the one or more processors 114 to receive an input indicative of a particular data source (e.g., the one or more software applications 132, the one or more external databases 134, the one or more databases 110 of the one or more user devices 104, the one or more databases 110a of the host server 119, and/or the one or more databases 124 of the directory server 102, for example) to identify as a master data source for a particular dataset (e.g., the group options 210, the positions 204, and/or the employees). The interface application 112 may utilize the master data source when synchronizing the particular dataset with the one or more external software applications 132, the one or more external databases 134, the one or more databases 110 of the one or more user devices 104, the one or more databases 110a of the host server 119, and/or the one or more databases 124 of the directory server 102, as described above. That is, the interface application 112 when executed may cause the one or more processors 114 to copy the particular dataset from the master data source to each of the other data sources. In one embodiment, all of the datasets have the same master data source. However, in other embodiments, one or more of the datasets has a different master data source.

In some implementations, one or more of the usernames 306 may be imported into the one or more databases 110, 110a of the user device 104 and/or the host server 119 as they are added to the master data source. In some implementations, once added, the usernames 306 may appear in the employee subwindow 706 of the employee window 700.

If an employee is no longer with the organization, synchronizing the interface application 112 with the master data source may remove the employee from the one or more databases 110, 110a of the user device 104 and/or the host server 119, ensuring the one or more databases 110, 110a of the user device 104 and/or the host server 119 and the directory service application 126 are accurate and complete without manual intervention.

In some implementations, the API setup window 2900 may further comprise an API setup back icon 2908 configured to be selectable, such as by a user moving the cursor 206 over the setup back icon 2908, and, upon being selected, to close the API setup window 2900 and display the administration window 2000 on the display 118.

Figure 30:
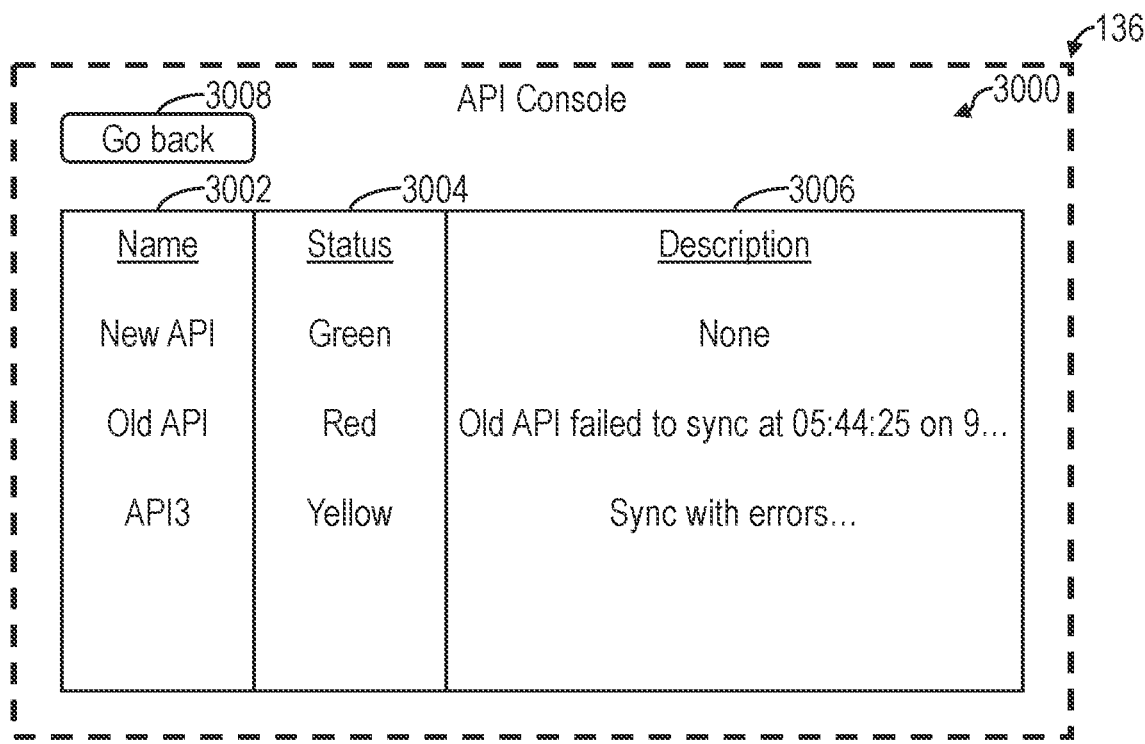
FIG. 30 is an exemplary screenshot of an application programming interface console window of a graphical user interface on a display in accordance with the present disclosure.

As illustrated in FIG. 30, in some implementations, the user interface 136 may include an API console window 3000 for monitoring statuses of the one or more external software applications 132 and/or the one or more external databases 134. The API console window 3000 may comprise an API list 3002, a status column 3004, and a description column 3006. The API list 3002 may list each of the one or more external software applications 132 and/or the one or more external databases 134 that have been defined.

For each of the external software applications 132 and the external databases 134 listed in the API list 3002, the status column 3004 may contain a status indicator and the description column 3006 may contain a description of the status indicator. The status indicator may be indicative of a synchronization status of the external software application 132 or the external database 134; that is, a "green" status indicator may indicate that the external software application 132 or the external database 134 is synchronized, a "yellow" status indicator may indicate that the external software application 132 or the external database 134 is synchronized with a warning or error, and a "red" status indicator may indicate that the external software application 132 or the external database 134 is not synchronized.

In some implementations, the API console window 3000 may further comprise an API console back icon 3008 configured to be selectable, such as by a user moving the cursor 206 over the API console back icon 3008 and, upon being selected, to close the API console window 3000 and display the administration window 2000 on the display 118.

An example of the computer system 100 of FIG. 1 in a hypothetical use case will now be described. For the purposes of this hypothetical, an exemplary organization is a single company having over one thousand employees spread across two divisions, six departments, more than one hundred locations (between all divisions and departments), and hundreds of areas (including, for example, sales territories, operational areas, etc.).

A user in the organization interacts with the interface application 112 to cause the one or more processors 114 to instruct the directory service application 126 to create and/or delete permission groups 304a-n and position-access permissions 308a-n in the directory service domain 300, 300a utilizing permissions structures that are "position"-based, rather than "person"-based. Although organizations make changes to positions from time to time, these changes are much less frequent than changes in personnel. Additionally, if the organization is involved in a reorganization, acquisition, or expansion, the interface application 112 may allow a user to drag a branch of the organization that is being reassigned or removed and drop the branch in a new place in the organizational structure (see, for example, FIGS. 17A and 17B) or remove the branch altogether. At this point, the interface application 112 may send a signal indicative of a query directing the directory server 102 to make the necessary changes to the directory service domain 300, and the changes may be made without further user intervention.

It is anticipated that using the computer system 100 and associated methods may reduce the resources required by over 95%, and in some cases over 98%, in comparison to prior art systems and methods.

Additionally, the interface application 112 allows changes to positions 204 at the top of an organizational structure to be propagated to each of the subordinate positions 204 below them. Further, removing a position 204 or other object (e.g., an employee, a permission group 304a-n, etc.) is also made simple by the interface application 112, which may allow a user to remove any object using drag-and-drop methods or other interface methods.

An example of the computer-implemented method 400 (shown in FIG. 4) in a hypothetical will now be described. At step 402 of the presently described method 400, the creation of a position group 302 for a sales associate position 204 may be initiated by using the interface application 112 to interface with the directory service domain 300. The pop-up window 510 for the position window 500 may allow a user to input descriptors identifying the group options 210 for the sales associate position 204, which in this example are software division, sales department, Los Angeles location, and West Coast area.

At step 404, the interface application 112 may cause the one or more processors 114 to transmit via the network 106 a signal indicative of a query directing the directory server 102 to create the sales associate position group 302 and add the sales associate position group 302 to the directory service domain 300.

The directory service domain 300 may be automatically adjusted to add the section groups 310a-n based on the group options 210 input at step 402, which in this example would be a software division section group 310a, a sales department section group 310b, a Los Angeles location section group 310c, and a West Coast area group 310d. Of course, it will be understood that in some implementations, the section groups 310a-d may have been previously created. At step 406, the sales associate position group 302 may be added to the section groups 310a-d, thereby assigning position-access permissions and/or position-access limitations from the section groups 310a-d to the sales associate position group 302.

Additionally, sales associate position group 302 may be added to the one or more template groups 316a-n to assign a combination of position-access permissions 308b, 308c for accessing one or more software applications and/or one or more reports (i.e., position-access permissions 308d) to the sales associate position 204, such as for accessing a Customer Relationship Management software application and the sales report for the West Coast area.

At step 408, once the sales associate position group 302 is created and assigned the above-described position-access permissions 308, a user may access the employee subwindow 706 of the employee window 700 using the interface application 112 and drag-and-drop an employee icon 702 associated with a "janedoe" username 306 onto a position icon 602 for the sales associate position 204 to assign the "janedoe" username 306 to the sales associate position 204.

At step 410, because the sales associate position group 302 has already been assigned the above-described position-access permissions 308, the interface application 112 need only transmit via the network 106 a signal indicative of a query directing the directory server 102 to assign the "janedoe" username 306 to the sales associate position group 302, thereby assigning the position-access permissions 308 associated with the sales associate position group 302 to the "janedoe" username 306 (i.e., the position-access permissions 308 associated with the section groups 310a-d for the software division, the sales department, the Los Angeles location, and the West Coast area, and the template group 316a-n for the CRM application and the sales report for the West Coast area).

Performing the presently described method 400 may ensure that the "janedoe" username 306 assigned to the sales associate position group 302 is able to access only the content that the sales associate position 204 is authorized to access, whether the content is included in a report or a software application. That is, while the "janedoe" username 306 may be able to access the sales report for the West Coast area, the "janedoe" username 306 may not be able to access one or more portions of the sales report that are specifically relevant to a hypothetical San Francisco location, because the sales associate position group 302 is not a member of a section group 310a-n for a San Francisco location.

Though particular user interfaces 136 and user input devices have been described, it will be understood by a person having ordinary skill in the art that adaptations and variations of user interfaces 136 are contemplated.

From the above description and examples, it is clear that the inventive concepts disclosed and claimed herein are well adapted to attain the advantages mentioned herein. The interface application 112 may allow the user to communicate with the directory server 102, such as via the network 106, to manage position-access permissions 308 within the directory service domain 300 based on positions 204 within the organizational structure of an organization, rather than on usernames 306. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein. However, it is to be understood that the example is for illustrative purposes only and is not to be construed as limiting the scope of the disclosure. Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set. No element, act, or instruction used in the present application should be construed as critical or essential to the invention unless explicitly described as such.

What is claimed is:

1. A non-transitory computer readable medium having computer executable instructions that when executed cause a processor to:
    receive a first input from a user interface, the first input indicative of a new position within an organizational structure of an organization;
    direct a directory server to create a new position group for the new position within the directory server, the directory server storing a plurality of position groups, a plurality of permission groups, and a plurality of position-access permissions assigned to the plurality of permission groups, each of the plurality of position groups containing up to one username and no position-access permissions, each of the plurality of permission groups containing no usernames;
    direct the directory server to nest the new position group within two or more permission groups of the plurality of permission groups by assigning the new position group as a member within each of the two or more permission groups, thereby causing the new position group to inherit particular position-access permissions assigned to the two or more permission groups;
    receive a second input from the user interface, the second input indicative of a username associated with the new position, the username identifying a person assigned to the new position within the organization; and
    direct the directory server to assign the username to the new position group, thereby associating the new position group with the person identified by the username and assigning the particular position-access permissions assigned to the two or more permission groups to the person associated with the new position group.

2. The non-transitory computer readable medium of claim 1, wherein the user interface is a graphical user interface displayed on a display screen.

3. The non-transitory computer readable medium of claim 2, wherein the graphical user interface comprises an interactive organizational chart.

4. The non-transitory computer readable medium of claim 3, wherein the interactive organizational chart is configured to receive one or more of the first input and the second input based on selection and movement of one or more icons with a cursor by a user, wherein the one or more icons are indicative of one or more of the username and the new position.

5. The non-transitory computer readable medium of claim 3, wherein the computer executable instructions when executed further cause the processor to: print a graphical representation of the interactive organizational chart.

6. The non-transitory computer readable medium of claim 1, wherein the plurality of permission groups comprises one or more of:
    one or more section groups comprising position-access permissions based on structural subgroups of the organization in the real world;
    one or more software application groups comprising position-access permissions for group members to access one or more particular software applications;
    one or more report groups comprising position-access permissions for group members to access one or more predetermined reports; and
    one or more template groups comprising position-access permissions for group members to access a combination of two or more of reports or software applications.

7. The non-transitory computer readable medium of claim 6, wherein the computer executable instructions when executed further cause the processor to:
- receive a third input from the user interface, the third input indicative of an access request by the person associated with the new position group to access one or more of particular software applications and predetermined reports; and
- direct the directory server to determine, based upon the two or more permission groups within which the new position group is a member, whether the position-access permissions assigned to the person include position-access permissions to access the one or more of particular software applications and predetermined reports.

8. The non-transitory computer readable medium of claim 6, wherein the structural subgroups of the organization in the real world comprise one or more of: divisions, departments, areas, companies, and geographic locations.

9. The non-transitory computer readable medium of claim 6, wherein the position-access permissions for the one or more section groups include position-access permissions for accessing one or more of network drives and computer network peripherals.

10. The non-transitory computer readable medium of claim 9, wherein the computer network peripherals comprise network-connected devices including one or more of network printers, network scanners, network photocopiers, and network faxes.

11. The non-transitory computer readable medium of claim 1, wherein the new position is a first new position and the new position group is a first new position group, the non-transitory computer readable medium having computer executable instructions that when executed further cause the processor to:
- receive a third input from the user interface, the third input indicative of a second new position within the organizational structure of the organization;
- direct the directory server to create a second new position group for the second new position within the directory server; and
- direct the directory server to nest the second new position group within the two or more permission groups in which the first new position group is nested by assigning the second new position group as a member within each of the two or more permission groups.

12. The non-transitory computer readable medium of claim 1, wherein the first input indicative of the new position is further indicative of a selection of the two or more permission groups of the plurality of permission groups.

13. The non-transitory computer readable medium of claim 1, wherein the computer executable instructions when executed further cause the processor to: synchronize with one or more of external software applications and databases.

14. The non-transitory computer readable medium of claim 13, wherein the one or more of external software applications and databases comprise one or more of human resources software systems, customer relationship management software systems, enterprise resource planning software systems, office productivity software systems, and databases.

15. The non-transitory computer readable medium of claim 13, wherein the computer executable instructions when executed further cause the processor to: synchronize with the one or more of external software applications and databases through one or more of external application programming interfaces (API) and direct queries.

16. The non-transitory computer readable medium of claim 13, wherein the one or more of external software applications and databases are one or more of human resources software systems and databases, and wherein at least one of the first input and the second input is received from the one or more of human resources software systems and databases.

17. The non-transitory computer readable medium of claim 16, the non-transitory computer readable medium having computer executable instructions that when executed further cause the processor to automatically update an organizational chart with the at least one of the first input and the second input.

18. A non-transitory computer readable medium having computer executable instructions that when executed cause a processor to:
- receive a first input from a user interface, the first input indicative of a username of a person to be associated or dissociated with a position within an organizational structure of an organization; and
- direct a directory server to assign the username to a first position group within the directory server when the person is associated with the position and to remove the username from the first position group when the person is dissociated with the position, thereby associating or dissociating correspondingly the first position group with the person identified by the username, the directory server storing a plurality of position groups, a plurality of permission groups, and a plurality of position-access permissions assigned to the plurality of permission groups, each of the plurality of position groups containing up to one username and no position-access permissions, each of the plurality of permission groups containing no usernames, the first position group associated with two or more permission groups of the plurality of permission groups such that the first position group inherits particular position-access permissions assigned to the two or more permission groups, thereby assigning the particular position-access permissions assigned to the two or more permission groups to the person associated with the first position group or revoking the particular position-access permissions assigned to the two or more permission groups from the person dissociated with the first position group.

19. A computer-implemented method, comprising:
- receiving, with one or more computer processors, a first input from a user interface, the first input indicative of a new position within an organizational structure of an organization;
- directing, with the one or more computer processors, a directory server to create a new position group for the new position within the directory server, the directory server storing a plurality of position groups, a plurality of permission groups, and a plurality of position-access permissions assigned to the plurality of permission groups, each of the plurality of position groups containing up to one username and no position-access permissions, each of the plurality of permission groups containing no usernames;
- directing, with the one or more computer processors, the directory server to nest the new position group within two or more permission groups of the plurality of permission groups by assigning the new position group as a member within each of the two or more permission groups, thereby causing the new position group to inherit particular position-access permissions assigned to the two or more permission groups;

receiving, with the one or more computer processors, a second input from the user interface, the second input indicative of a username associated with the new position, the username identifying a person assigned to the new position within the organization; and directing, with the one or more computer processors, the directory server to assign the username to the new position group, thereby associating the new position group with the person identified by the username, and assigning the particular position-access permissions assigned to the two or more permission groups to the person associated with the new position group.

20. The computer-implemented method of claim 19, wherein the user interface is a graphical user interface comprising an interactive organizational chart.

\* \* \* \* \*